United States Patent
Lalithambika et al.

(10) Patent No.: US 11,456,668 B2
(45) Date of Patent: Sep. 27, 2022

(54) METHOD AND DEVICE FOR SWITCHING REGULATOR CONTROL

(71) Applicant: Renesas Electronics America Inc., Milpitas, CA (US)

(72) Inventors: Vinod Aravindakshan Lalithambika, Girton (GB); Allan Warrington, Rochester (GB); Vipul Raithatha, Northampton (GB)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 0 days.

(21) Appl. No.: 17/083,021

(22) Filed: Oct. 28, 2020

(65) Prior Publication Data

US 2021/0126537 A1 Apr. 29, 2021

Related U.S. Application Data

(60) Provisional application No. 62/927,374, filed on Oct. 29, 2019.

(51) Int. Cl.
| | |
|---|---|
| *H02M 3/158* | (2006.01) |
| *H02M 1/00* | (2006.01) |
| *H02M 1/32* | (2007.01) |

(52) U.S. Cl.
CPC ......... *H02M 3/158* (2013.01); *H02M 1/0006* (2021.05); *H02M 1/32* (2013.01)

(58) Field of Classification Search
None
See application file for complete search history.

(56) References Cited

U.S. PATENT DOCUMENTS

| | | | |
|---|---|---|---|
| 6,922,044 B2 * | 7/2005 | Walters | H02J 1/102 323/288 |
| 7,595,624 B2 * | 9/2009 | Tateishi | H02M 3/158 323/288 |
| 8,138,740 B2 * | 3/2012 | Yuan | G05F 1/10 323/288 |
| 8,390,263 B2 * | 3/2013 | Chiang | H02M 1/36 323/284 |
| 2010/0033261 A1 * | 2/2010 | Stevenson | H03K 7/08 332/109 |
| 2018/0183331 A1 * | 6/2018 | Chen | H02M 3/158 |
| 2019/0140534 A1 * | 5/2019 | Lo | H02M 1/36 |
| 2021/0050790 A1 * | 2/2021 | Talari | H02M 1/32 |
| 2021/0091671 A1 * | 3/2021 | Fukushima | H02M 3/1588 |

* cited by examiner

*Primary Examiner* — Matthew V Nguyen
(74) *Attorney, Agent, or Firm* — Foley & Lardner LLP

(57) ABSTRACT

A method of operating a hysteretic synthetic current-mode switching regulator is disclosed. In the switching regulator, PWM pulses (PWM) are generated by a PWM generator (20; FIG. 7) in dependence upon a ramp voltage (VR) which oscillates between upper and lower window voltages (VW+, VW−). The ramp voltage depends on a control voltage (VC) which depends on current (IL) through an inductor (6). The method comprise determining whether a period (T) equal to or greater than a given period (TREFRESH) has elapsed without a PWM pulse being generated, upon a positive determination, causing the ramp voltage to be pulled up to or above the upper window voltage (VW+) for a given duration (ΔT) and when said given duration has elapsed, causing the ramp voltage to decrease until a rising edge of a PWM pulse is generated.

14 Claims, 32 Drawing Sheets

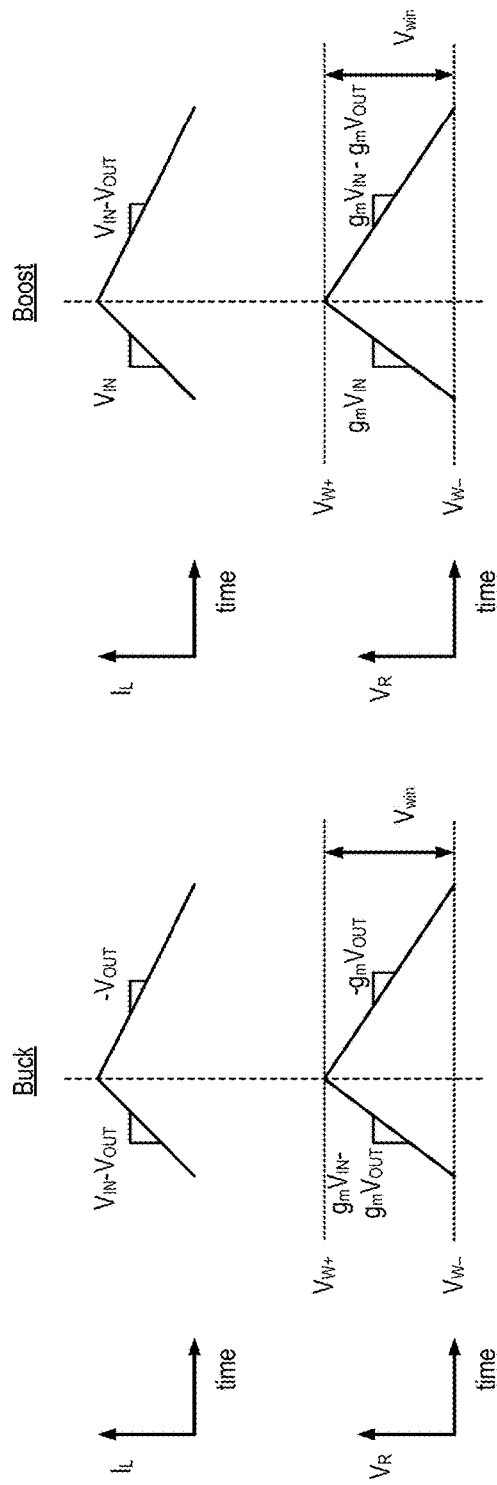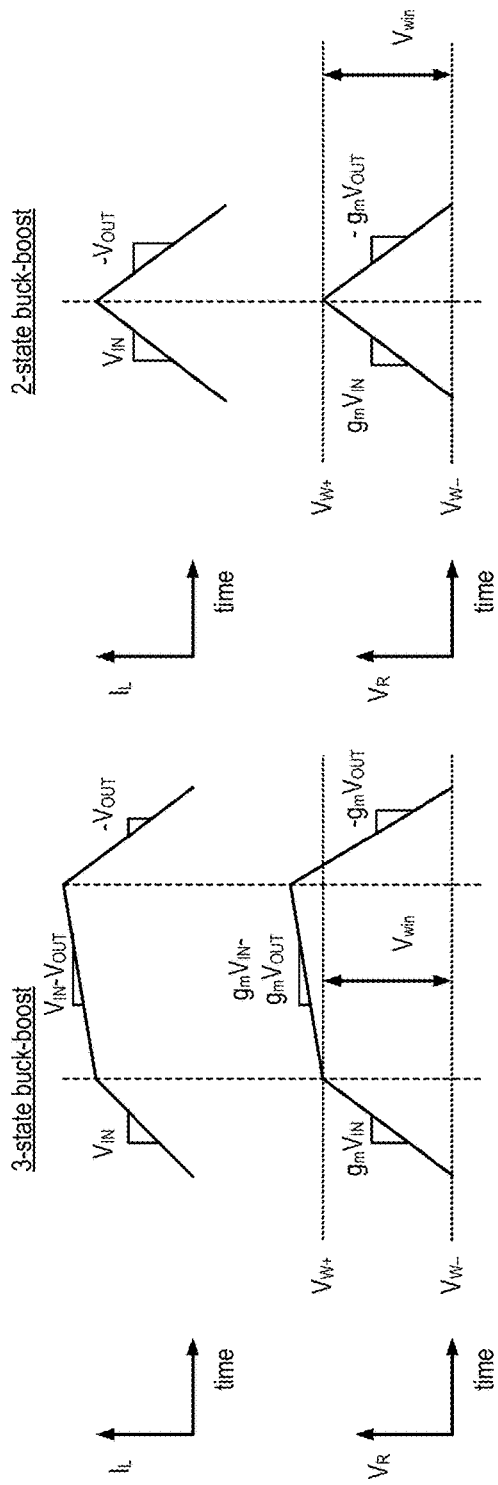

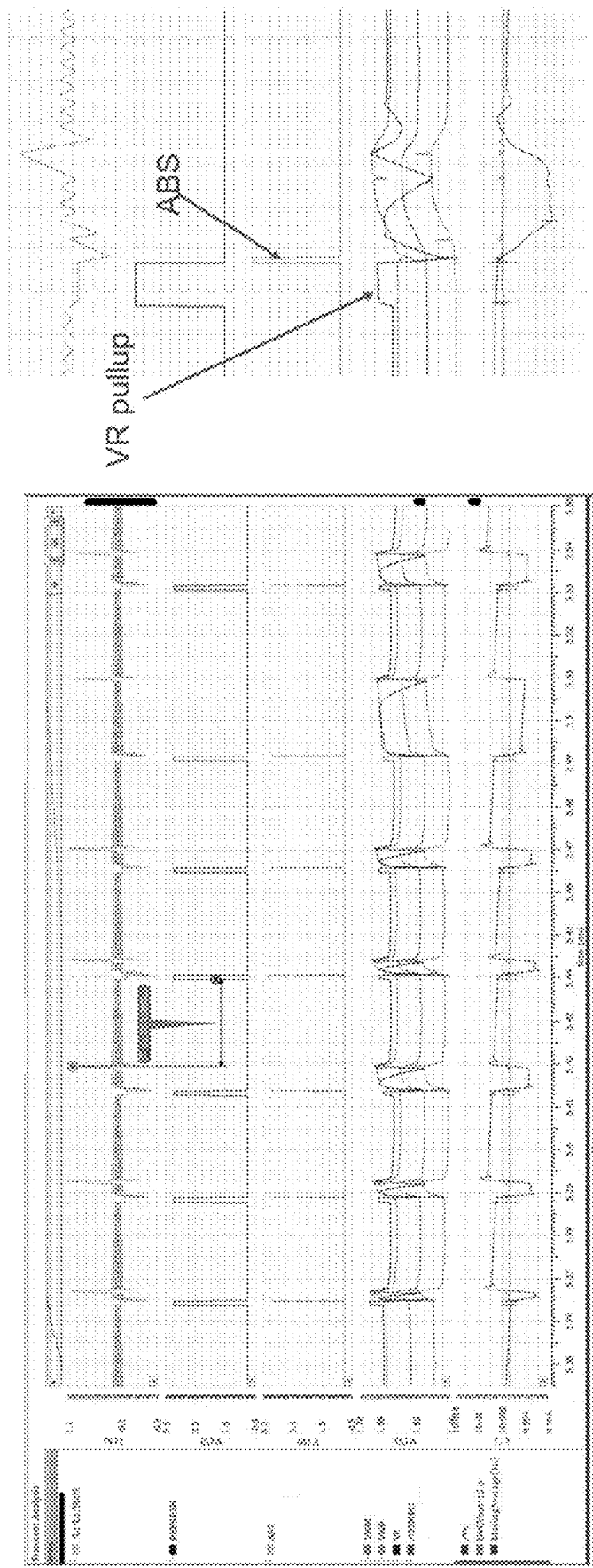

| Cycle | UG1 | LG1 | UG2 | LG2 |
|---|---|---|---|---|
| Tri-state | OFF (Buck, BUBO) ON (Boost) | OFF | ON (Buck) OFF (BUBO, Boost) | OFF |
| Refresh | OFF | ON | OFF | ON |
| ABS | OFF | ON | ON | OFF |
| PWM cycle | Buck ON/Buck OFF (Buck) Boost ON/Boost OFF (Boost) Boost ON/Boost OFF/T2 period (Buck Boost) | | | |
| Tri-state | OFF (Buck, BUBO) ON (Boost) | OFF | ON (Buck) OFF (Boost, BST) | OFF |

BUBO = Buck-boost

Fig. 17

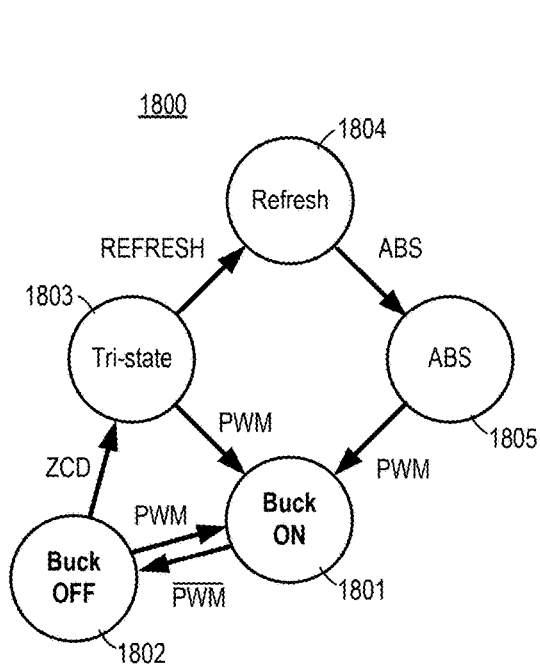

Fig. 18A

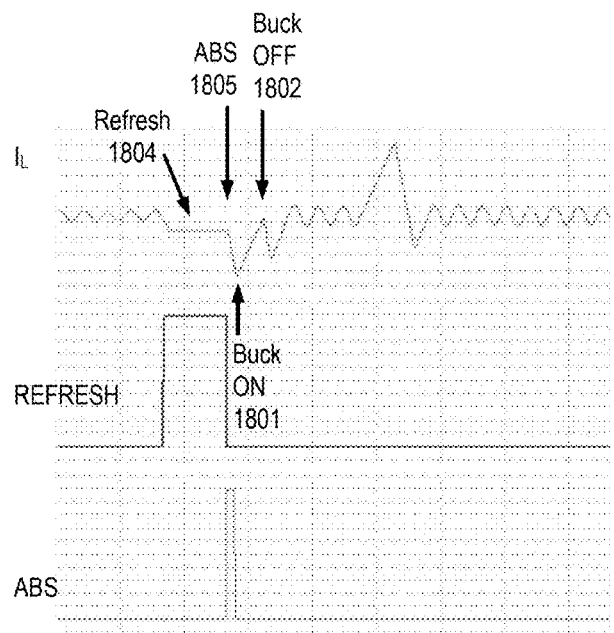

Fig. 18B

| Cycle | UG1 | LG1 | UG2 | LG2 | Comment | |
|---|---|---|---|---|---|---|
| Tri-state | OFF | OFF | ON | OFF | $V_L = V_{LX1}-V_{LX2}$ damped ringing, LX1 damped ringing, LX2=VOUT, Inductor current damped ringing | |
| Refresh | OFF | ON | OFF | ON | $V_L = 0$, LX1=LX2=0, Inductor current recycled | |
| Buck ON | ON | OFF | ON | OFF | $V_L$=VIN-VOUT, LX1=VIN, LX2=VOUT, Inductor currents ramps up | Buck PWM cycle(s) |
| Buck OFF | OFF | ON | ON | OFF | $V_L$ = -VOUT, LX1 =0, LX2 = VOUT, Inductor current ramps down. If inductor current is zero system enters tri-state. | |
| Tri-state | OFF | OFF | ON | OFF | $V_L=V_{LX1}-V_{LX2}$ damped ringing, LX1 damped ringing, LX2=VOUT, Inductor current damped ringing | |
| ABS | OFF | ON | ON | OFF | $V_L$ = -VOUT, LX1 =0, LX2 = VOUT, Inductor current ramps down. | |

Fig. 18C

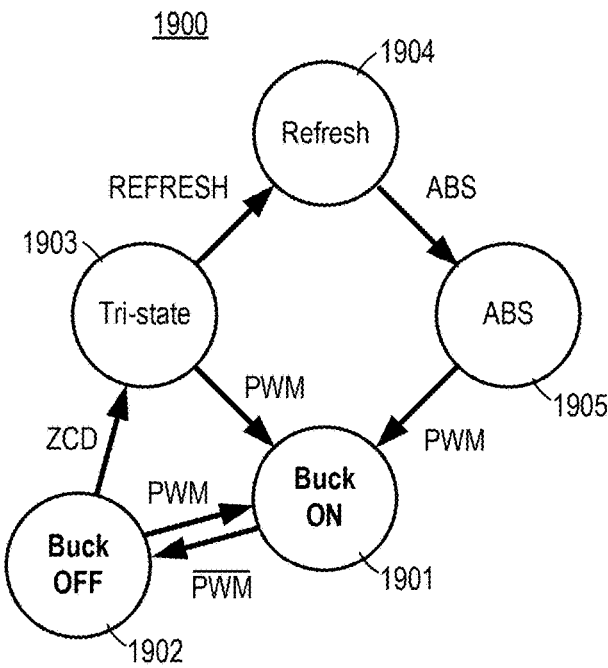

Fig. 19A

| Cycle | UG | LG | Comment | |
|---|---|---|---|---|
| Tri-state | OFF | OFF | $VL=V_{LX}-V_{OUT}$ damped ringing, LX damped ringing, Inductor current damped ringing | |
| Refresh | OFF | OFF | VL ~ 0. Ringing died out. Internal ramp (VR) pulled up. This would be a short period | |
| Buck ON | ON | OFF | VL=VIN-VOUT, LX=VIN Inductor currents ramps up | Buck PWM cycle(s) |
| Buck OFF | OFF | ON | VL = -VOUT, LX =0, Inductor current ramps down. If inductor current is zero system enters tri-state. | |
| Tri-state | OFF | OFF | $VL=V_{LX}-V_{OUT}$ damped ringing, LX damped ringing, Inductor current damped ringing | |
| ABS | OFF | ON | VL = -VOUT, LX = 0, Inductor current ramps down | |

Fig. 19B

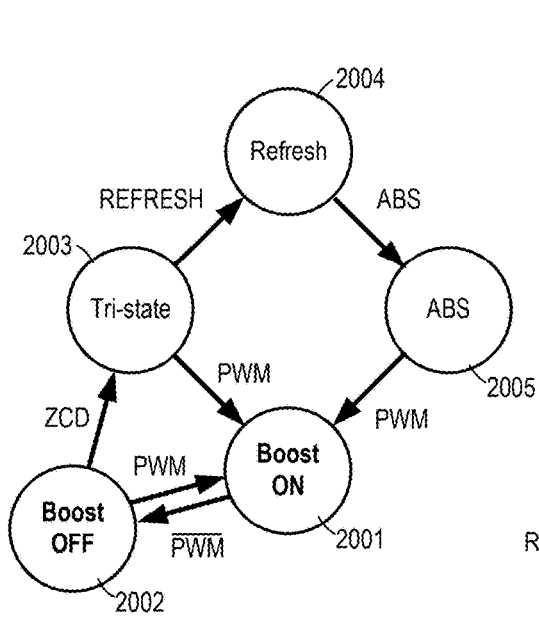
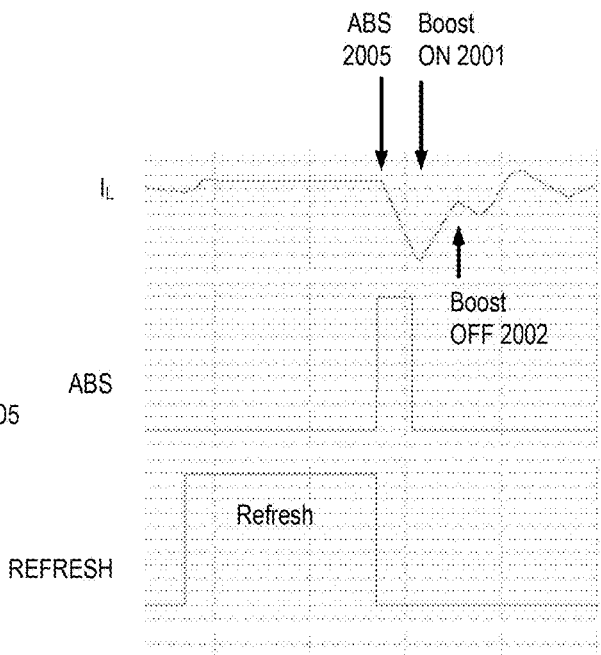

| Cycle | UG1 | LG1 | UG2 | LG2 | Comment | |
|---|---|---|---|---|---|---|
| Tri-state | ON | OFF | OFF | OFF | $V_L = V_{LX1} - V_{LX2}$ damped ringing, LX2 damped ringing, LX1=VIN, Inductor current damped ringing | |
| Refresh | OFF | ON | OFF | ON | $V_L = 0$, LX1=LX2=0, Inductor current recycled | |
| ABS | OFF | ON | ON | OFF | $V_L$ = VIN-VOUT, LX1 =VIN, LX2 = VOUT, Inductor current reversed, Output capacitor discharged | |
| Boost ON | ON | OFF | OFF | ON | $V_L$=VIN, LX1=VIN, LX2=0, Inductor currents ramps up | Boost PWM cycle(s) |
| Boost OFF | OFF | ON | ON | OFF | $V_L$ = VIN-VOUT, LX1 =VIN, LX2 = VOUT, Inductor current ramps down. If inductor current is zero system enters tri-state | |

Fig. 20C

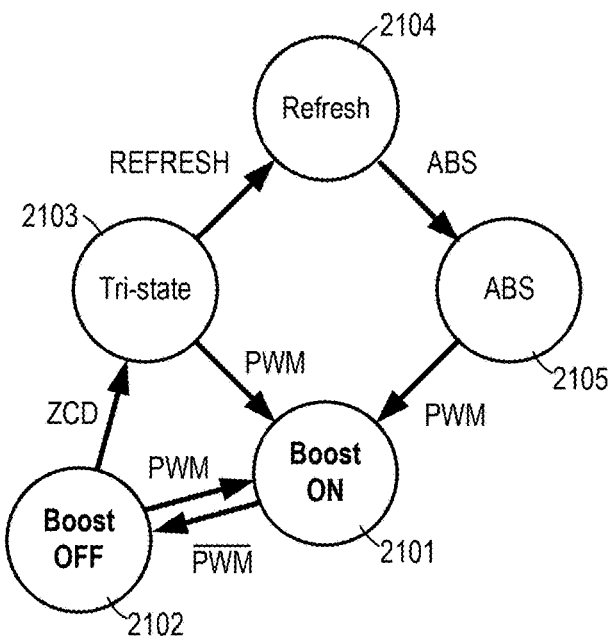

Fig. 21A

| Cycle | UG | LG | Comment |
|---|---|---|---|
| Tri-state | OFF | OFF | $V_L = V_{IN} - V_{LX}$ damped ringing, LX damped ringing, Inductor current damped ringing |
| Refresh | OFF | OFF | $V_L = 0$, Ringing has died out. Internal ramp (VR) pulled up. This would be for a short period |
| ABS | ON | OFF | $V_L = V_{IN} - V_{OUT}$, $LX2 = V_{OUT}$, Inductor current reversed, Output capacitor discharged |
| Boost ON | ON | OFF | $V_L = V_{IN}$, $LX = 0$, Inductor currents ramps up |
| Boost OFF | ON | OFF | $V_L = V_{IN} - V_{OUT}$, $LX = V_{OUT}$, Inductor current ramps down. If inductor current is zero system enters tri-state |

Boost PWM cycle(s) (bracketing Boost ON and Boost OFF rows)

Fig. 21B

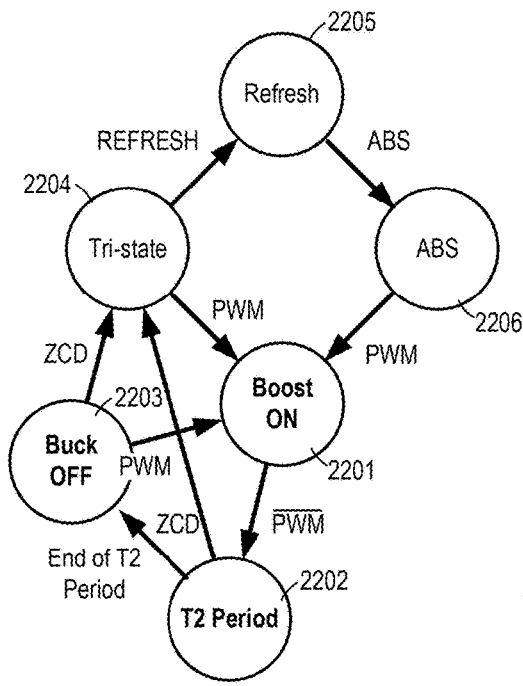

Fig. 22A

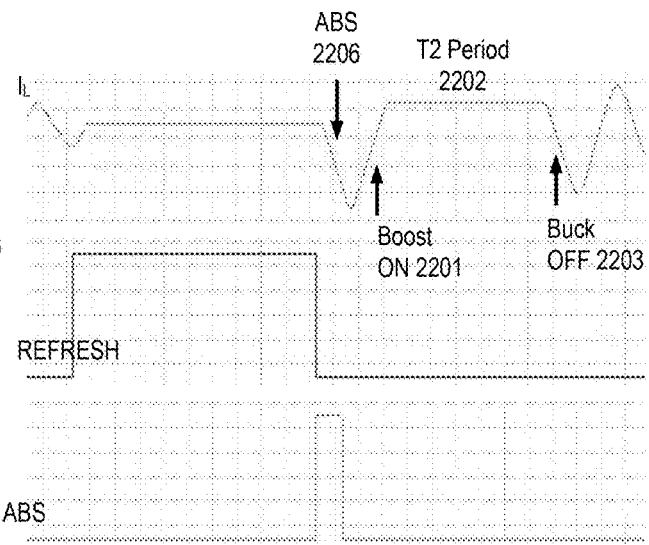

Fig. 22B

| Cycle | UG1 | LG1 | UG2 | LG2 | Comment | |
|---|---|---|---|---|---|---|
| Tri-state | OFF | OFF | OFF | OFF | VL=$V_{LX1}$-$V_{LX2}$ damped ringing, LX2 and LX2 damped ringing, Inductor current damped ringing | |
| Refresh | OFF | ON | OFF | ON | VL = 0, LX1=LX2=0, Inductor current recycled | |
| Boost ON | ON | OFF | OFF | ON | VL=VIN, LX1=VIN, LX2=0, Inductor currents ramps up | Buck-boost PWM cycle(s) |
| T2 period | ON | OFF | ON | OFF | VL = VIN-VOUT, LX1 =VIN, LX2 = VOUT, Inductor current ramps down. T2 period is terminated If inductor current is zero system or after a fixed period. | |
| Buck OFF | OFF | ON | ON | OFF | VL = -VOUT, LX1 =0, LX2 = VOUT, Inductor current ramps down. If inductor current is zero system enters tri-state. | |
| Tri-state | OFF | OFF | OFF | OFF | VL=$V_{LX1}$-$V_{LX2}$ damped ringing, LX2 and LX2 damped ringing, Inductor current damped ringing | |
| ABS | OFF | ON | ON | OFF | VL = -VOUT, LX1 =0, LX2 = VOUT, Inductor current ramps down. If inductor current is zero system enters tri-state. | |

Fig. 22C

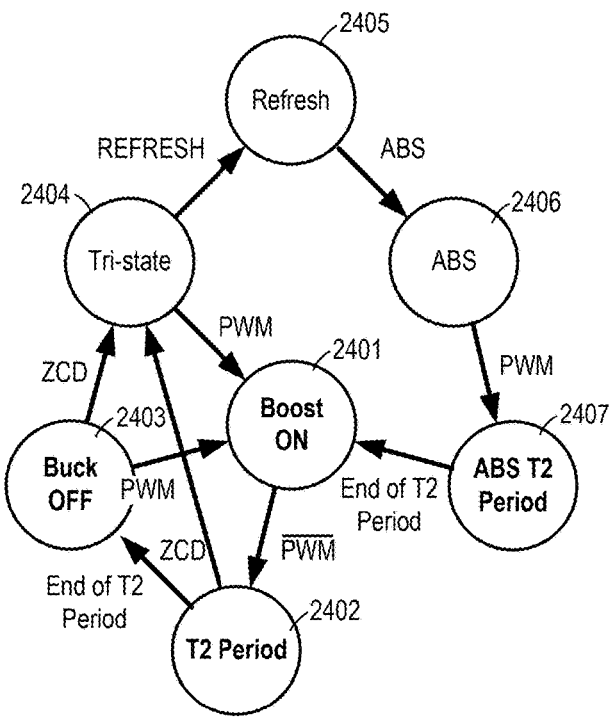

| Cycle | UG1 | LG1 | UG2 | LG2 | Comment | |
|---|---|---|---|---|---|---|
| Tri-state | OFF | OFF | OFF | OFF | VL=$V_{LX1}$-$V_{LX2}$ damped ringing, LX2 and LX2 damped ringing, Inductor current damped ringing | |
| Refresh | OFF | ON | OFF | ON | VL = 0, LX1=LX2=0, Inductor current recycled | |
| Boost ON | ON | OFF | OFF | ON | VL=VIN, LX1=VIN, LX2=0, Inductor currents ramps up | Buck-boost PWM cycle(s) |
| T2 period | ON | OFF | ON | OFF | VL = VIN-VOUT, LX1 =VIN, LX2 = VOUT | |
| Buck OFF | OFF | ON | ON | OFF | VL = -VOUT, LX1 =0, LX2 = VOUT, Inductor current ramps down. If inductor current is zero system enters tri-state. | |
| Tri-state | OFF | OFF | OFF | OFF | VL=$V_{LX1}$-$V_{LX2}$ damped ringing, LX2 and LX2 damped ringing, Inductor current damped ringing | |
| ABS | OFF | ON | ON | OFF | VL = -VOUT, LX1 =0, LX2 = VOUT, Inductor current ramps down. If inductor current is zero system enters tri-state. | |
| ABS T2 period | ON | OFF | ON | OFF | VL = VIN-VOUT, LX1 =VIN, LX2 = VOUT | |

METHOD AND DEVICE FOR SWITCHING REGULATOR CONTROL

CROSS-REFERENCE TO RELATED PATENT APPLICATIONS

This application claims priority to U.S. Provisional Patent Application Ser. No. 62/927,374, entitled "REFRESH CYCLES AND AUDIO BAND SUPPRESSION IN SYNTHETIC RAMP HYSTERETIC CONTROLLER," filed Oct. 29, 2019, the contents of such application being hereby incorporated by reference in its entirety and for all purposes as if completely and fully set forth herein.

TECHNICAL FIELD

The present implementations relate generally to voltage regulators, and more particularly to switching regulator control.

BACKGROUND

Switching regulators can be used to convert one DC voltage to another DC voltage. For example, a buck converter can be used to step-down a voltage, a boost converter can be used to step-up a voltage, and a buck-boost can be used for stepping-down or stepping-up a voltage. A switching regulator typically employs pulse-width modulation (PWM) to control switches in a power stage to vary current flowing through an inductor. The duty cycle of a PWM signal is controlled based on the inductor current and varying the duty cycle is used to adjust the output voltage. Rather than sense the inductor current directly, switching regulators can synthesise inductor current information by measuring voltage across the inductor. This can be used to generate a sawtooth signal whose value is proportional to the inductor current. The upper and lower values of the sawtooth signal can be kept within a hysteric window having upper and lower limits. The level of the hysteric window is varied using a control voltage which is based on feedback from the output and on a reference voltage. An arrangement which employs synthesis of current information and hysteric control is referred to as "synthetic current hysteretic control."

SUMMARY

According to a first aspect of the present invention there is provided a method of operating a hysteretic synthetic current-mode switching regulator in which PWM pulses are generated by a PWM generator in dependence upon a ramp voltage which oscillates between upper and lower window voltages and which depends on a control voltage which depends on current IL through an inductor. The method comprises determining whether a period T equal to or greater than a given period has elapsed without a PWM pulse being generated and, upon a positive determination, causing the ramp voltage to be pulled up to or above the upper window voltage for a given duration ΔT. The method further comprises, when said given duration has elapsed, causing the ramp voltage to decrease until a rising edge of a PWM pulse is generated. This can be used to ameliorate one or more issues which can arise at low loads, when switching frequency drops.

For example, the given period may equal to the discharge time of a bootstrap capacitor, which can between 200 and 800 microseconds or between 400 and 600 microseconds. Thus, when load is light and the switching frequency drops, bootstrap capacitors can be refreshed. The given period may be between 5 and 50 microseconds, for example, 50 microseconds. This can help to avoiding switching in the audio frequency range (i.e., 20 Hz to 20 kHz). Decreasing the ramp voltage may comprise decreasing the ramp voltage at a rate such that energy (or charge) stored in the inductor is the same as or greater than the energy (or charge) output by the inductor during the PWM pulse. Decreasing the ramp voltage may comprise adjusting a gain of a transconductance amplifier which generates the ramp voltage independence upon an output voltage.

A first amount of energy (or charge) may be extracted from the inductor in response to decreasing the ramp voltage which is greater than or equal to a second amount of energy (or charge) supplied to the inductor from in a period starting with the rising edge of the PWM pulse.

The rate decreasing the ramp voltage may depend on a first transconductance amplifier gain value. The first transconductance value may be set to have a value which greater than or equal twice a second transconductance amplified gain value during which ramp voltage increases from the rising edge of the PWM pulse.

The method may comprise causing the switching regulator to enter a state during which current IL through an inductor is maintained for a given period so that the first amount of energy (or charge) is equal to or greater than the second amount of energy (or charge).

The switching regulator may be operable in a PWM mode and in a PFM mode (at different times). Herein, the term "PWM pulse" is intended to cover a PFM pulse generated in a PFM mode.

According to a second aspect of the present invention there is provided a method of operating a hysteretic synthetic current-mode switching regulator in which PWM pulses are generated by a PWM generator in dependence upon a ramp voltage which oscillates between upper and lower window voltages and which depends on a control voltage which depends on current IL through an inductor. The method comprises extracting a first amount of energy from the inductor in response to decreasing the ramp voltage which is greater than or equal to a second amount of energy supplied to the inductor from in a period starting with the rising edge of the PWM pulse.

The rate decreasing the ramp voltage may depend on a first transconductance amplifier gain value. The first transconductance value may be set to have a value which greater than or equal twice a second transconductance amplified gain value during which ramp voltage increases from the rising edge of the PWM pulse.

The method may comprise causing the switching regulator to enter a state during which current IL through an inductor is maintained for a given period so that the first amount of energy (or charge) is equal to or greater than the second amount of energy (or charge).

The method comprises determining whether a period T equal to or greater than a given period has elapsed without a PWM pulse being generated and, upon a positive determination, causing the ramp voltage to be pulled up to or above the upper window voltage for a given duration ΔT. The method may further comprise, when said given duration has elapsed, causing the ramp voltage to decrease until a rising edge of a PWM pulse is generated.

According to a third aspect of the present invention there is provided a device configured to perform the method of the first or second aspect.

According to a fourth aspect of the present invention there is provided a control circuit for controlling a hysteretic synthetic current-mode switching regulator in which PWM pulses are generated by a PWM generator in dependence upon a ramp voltage which oscillates between upper and lower window voltages and which depends on a control voltage VC which depends on current through an inductor. The device is configured to determine whether a period equal to or greater than a given period has elapsed without a PWM pulse being generated and, upon a positive determination, to cause the ramp voltage to be pulled up to or above the upper window voltage for a given duration. The device is configured, when said given duration has elapsed, to cause the ramp voltage to decrease until a rising edge of a PWM pulse is generated.

The device may be configured to set a first control signal which is provided to a control stage of the switching regulator so as to cause the ramp voltage to be pulled up to or above the upper window voltage. The device may be configured to set a second control signal which is provided to a pulse-frequency modulation control circuit and to the control stage of the switching regulator so as to cause the ramp voltage VR to be pulled up to or above the upper window voltage.

According to a fifth aspect of the present invention there is provided a switching regulator comprising a control stage. The control stage comprises a synthetic ramp generator circuit for generating the ramp voltage, the synthetic ramp generator circuit including a transconductance amplifier, a voltage ramp node, a modulator capacitor connected between the voltage ramp node and a reference level node, a first switch interposed between the output of the transconductance amplifier and the voltage ramp node and a second switch interposed between a voltage reference level and the voltage ramp node, a hysteretic control section circuit for controlling oscillation of the ramp voltage between the upper and lower window voltages and generating first and second signals for setting and re-setting the PWM signal respectively and a latch for generating the PWM pulses using the first and second signals. The switching regulator further comprises the control circuit of the third aspect which is configured to receive the PWM pulse from the control stage and provide control signals to the control stage for controlling gain of the transconductance amplifier and the first and second switches.

The switching regulator may further comprise a power stage for stepping up and/or stepping down an input voltage to provide an output voltage. The switching regulator may be a buck controller, a boost controller and/or a buck-boost controller. The switching regulator may further comprise bootstrap capacitor(s).

According to a sixth aspect of the present invention there is provided a monolithic integrated circuit comprising a device of the third or fourth aspect or the switching regulator of the fifth aspect.

According to a seventh aspect of the present invention there is provided a system comprising a device of the third or fourth aspect, the switching regulator of the fifth aspect and/or a monolithic integrated circuit of the sixth aspect and a host controller for controlling the device, the switching regulator and/or a monolithic integrated circuit. The host controller may comprise a microcontroller, system-on-a-chip (SoC) or other form of processor-based or logic-based controller.

According to an eighth aspect of the present invention there is provided an electronic system comprising a power source, a device of the third or fourth aspect, the switching regulator of the fifth aspect, a monolithic integrated circuit of the sixth aspect and a load of the seventh aspect. The electronic system may be a portable (e.g., hand-held or lap-top) electronic device, such as a mobile phone, tablet computing device or laptop computer and the load may be electronic circuitry within the portable electronic device. The electronic system may be a lighting system and the load may be lighting element(s), such as LED(s). The electronic system may be an automotive system and the load may be, for example, an electronic control unit. The power source may be a battery.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIGS. 2A to 2D show plots of inductor current against time and ramp voltage against time for a buck converter, a boost converter, a three-state buck-boost converter and a two-state buck-boost converter, respectively;

FIG. 17 is a table illustrating states together with gate control signals for a switching regulator;

FIG. 18A is a state diagram for a buck converter;

FIG. 18B illustrates simulated inductor current, together with REFRESH and ABS signals for a buck converter;

FIG. 18C is a table illustrating states together with gate control signals for a buck converter;

FIG. 19A is a state diagram for a two-switch buck converter;

FIG. 19B is a table illustrating states together with gate control signals for a two-switch buck converter;

FIG. 20A is a state diagram for a boost converter;

FIG. 20B illustrates simulated inductor current, together with REFRESH and ABS signals for a boost converter;

FIG. 20C is a table illustrating states together with gate control signals for a boost converter;

FIG. 21A is a state diagram for a two-switch boost converter;

FIG. 21B is a table illustrating states together with gate control signals for a two-switch boost converter;

FIG. 22A is a state diagram for a buck-boost converter;

FIG. 22B illustrates simulated inductor current, together with REFRESH and ABS signals for a buck-boost converter;

FIG. 22C is a table illustrating states together with gate control signals for a buck-boost converter;

FIG. 24C is a state diagram for a buck-boost converter employing an additional T2 period for reducing or avoiding an increase in buck-boost output voltage VOUT;

FIG. 24D is a table illustrating states together with gate control signals for a buck-boost converter;

DETAILED DESCRIPTION

Figure 1:
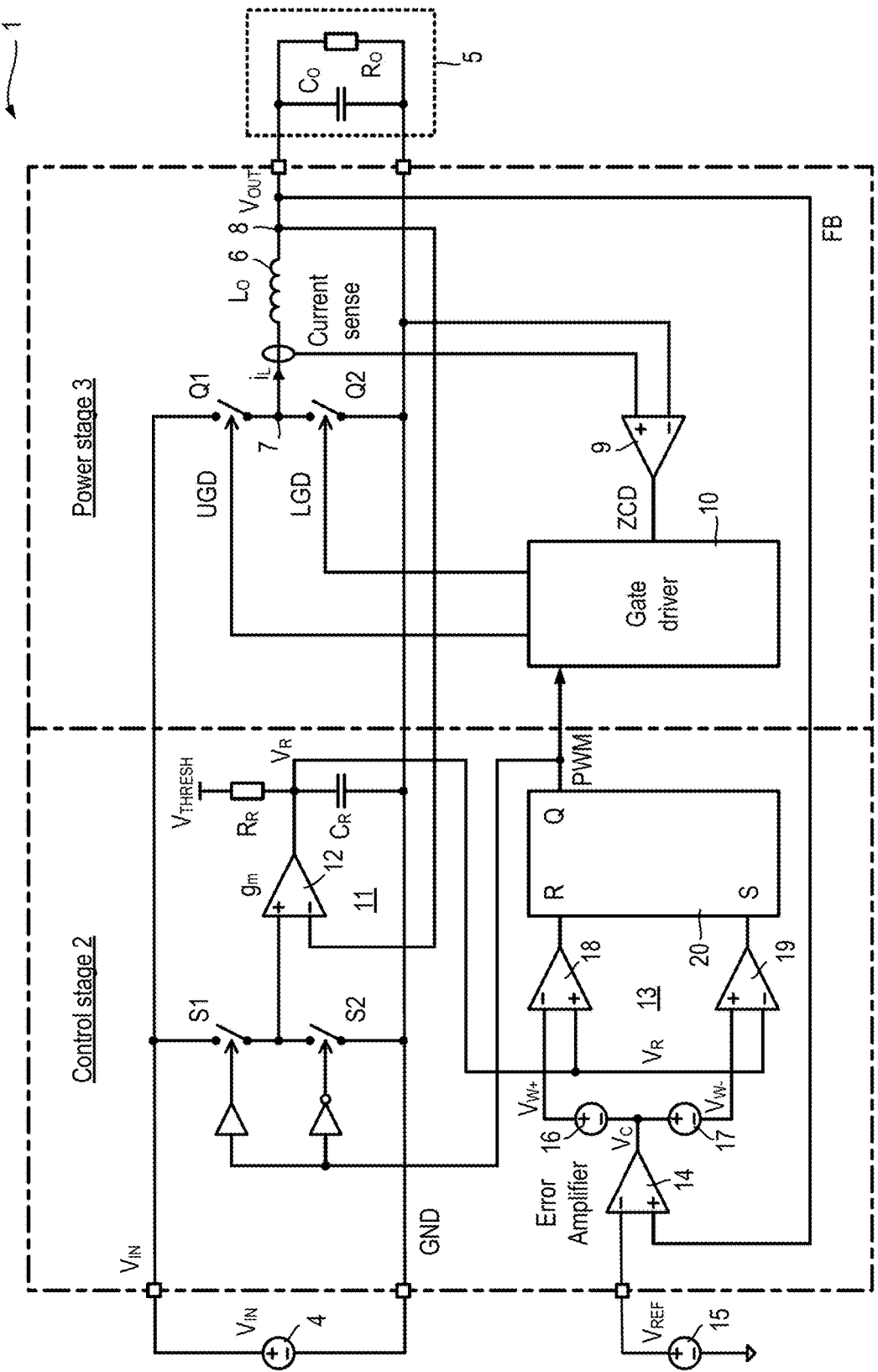
FIG. 1 is a circuit diagram of a hysteretic synthetic ramp buck converter.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Introduction. In the following, DC-to-DC converters mainly in the form of hysteretic synthetic current buck converters will be described. The comments and techniques, however, can be applied to other forms DC-to-DC converters, such as, for example, boost and buck-boost converters. In the following, like parts are denoted with like reference numerals.

Referring to FIG. 1, a hysteretic synthetic current-mode switching regulator 1 in the form of a hysteretic synthetic ramp buck converter is shown. The buck converter 1 includes a control stage 2 and a power stage 3. The buck converter 1 receives an input voltage $V_{IN}$ from an external voltage source 4 (such as a battery) which it steps-down to provide an output voltage $V_{OUT}$ to an external load 5 (such as a microprocessor-based device, memory or other electronic device requiring a specific voltage). The power stage 3 employs an energy-storage element in the form of an inductor 6 having an inductance $L_O$ and a resistance $R_L$. The voltage across the inductor 6 is switched between the input voltage $V_{IN}$ and ground GND using first and second switches Q1, Q2 arranged in a totem pole configuration between the input voltage $V_{IN}$ and a ground GND. The switches Q1, Q2 take the form of suitable power transistors, such as power MOSFETs. A common node 7 between the switches Q1, Q2 is connected to a first node ("phase node") of the inductor 6. A second node of the inductor 6 is connected to an output node 8.

A current $i_L$ through the inductor 6 is sensed and the sensed current is fed into a comparator 9. The comparator 9 serves as a zero-crossing detector and which outputs a zero-crossing detector signal ZCD which is fed to a gate driver 10. The switches Q1, Q2 are controlled by the gate driver 10 which supplies first and second gate drive signals UGD, LGD, respectively to the first (high-side) and second (low-side) switches Q1, Q2, respectively. The gate driver 10 is controlled by a pulse-width modulation (PWM) signal from the control stage 2. The output voltage $V_o$ is also sensed and is fed back to the control circuit 2 as feedback voltage FB.

The control stage 2 includes a synthetic ramp generator circuit 11 which includes a transconductance (or "$g_m$") amplifier 12 and a modulator capacitor $C_R$. Inductor current information is synthesized by sensing the inductor voltage $V_O$ using the transconductance amplifier 12 and generating a saw-tooth voltage ramp $V_R$ that is proportional to inductor current $i_L$. The inductor voltage $V_O$ is supplied to the inverting input of the amplifier 12 and the non-inverting input is switched between $V_{IN}$ and GND by a pair of switches S1, S2 arranged in a totem pole configuration between $V_{IN}$ and GND and controlled by PWM and nPWM (of "PWM bar"), respectively.

A hysteretic control section circuit 13 includes an error amplifier 14 which receives a voltage reference $V_{REF}$ from a voltage source 15 and the feedback signal FB, and outputs a control voltage $V_C$. The control voltage $V_C$ is supplied to first and second voltage level generators 16, 17 for generating upper and lower window levels $V_{W+}$, $V_{W-}$, which are supplied to an inverting input of a first comparator 18 and to a non-inverting input of a second comparator 19, respectively. The voltage ramp $V_R$ is supplied to both the non-inverting input of the first comparator 18 and the inverting input of a second comparator 19.

Outputs of the first and second comparators 18, 19 are provided to reset R and set S inputs, respectively of an SR latch 20. The Q output of the latch 20 is supplied as a PWM signal to the gate driver 10. The buck converter 1 is able to achieve peak-valley current mode control. Inductor current information is synthesized by sensing inductor voltage through the transconductance amplifier 12 to generate a saw-tooth voltage ramp $V_R$ that is proportional to inductor current $i_L$. Synthesized current can exhibit superior noise immunity compared to a sense current. Steady-state frequency is controlled by controlling hysteretic window against duty cycle. Hysteretic control allows frequency to change during transient conditions to improve transient speed. Frequency increases while the control voltage $V_C$ ramps up, and decreases while the control voltage $V_C$ ramps down.

Synthetic ramp $V_R$ vs $I_L$. Referring also to FIG. 2A, the current into the modulator capacitor $C_R$ is proportional to the voltage across the inductor 6. Therefore, the modulator ramp voltage $V_R$ is proportional to inductor current $i_L$. The ramp voltage $V_R$ is centred on the control signal $V_C$ and so the inductor current is proportional to the control signal $V_C$.

Referring to FIGS. 2B, 2C and 2D, behaviour of voltage ramp $V_R$ and inductor current $i_L$ for a boost converter, a three-state buck-boost converter and two-state buck-boost converter, respectively are shown.

Figure 3A:
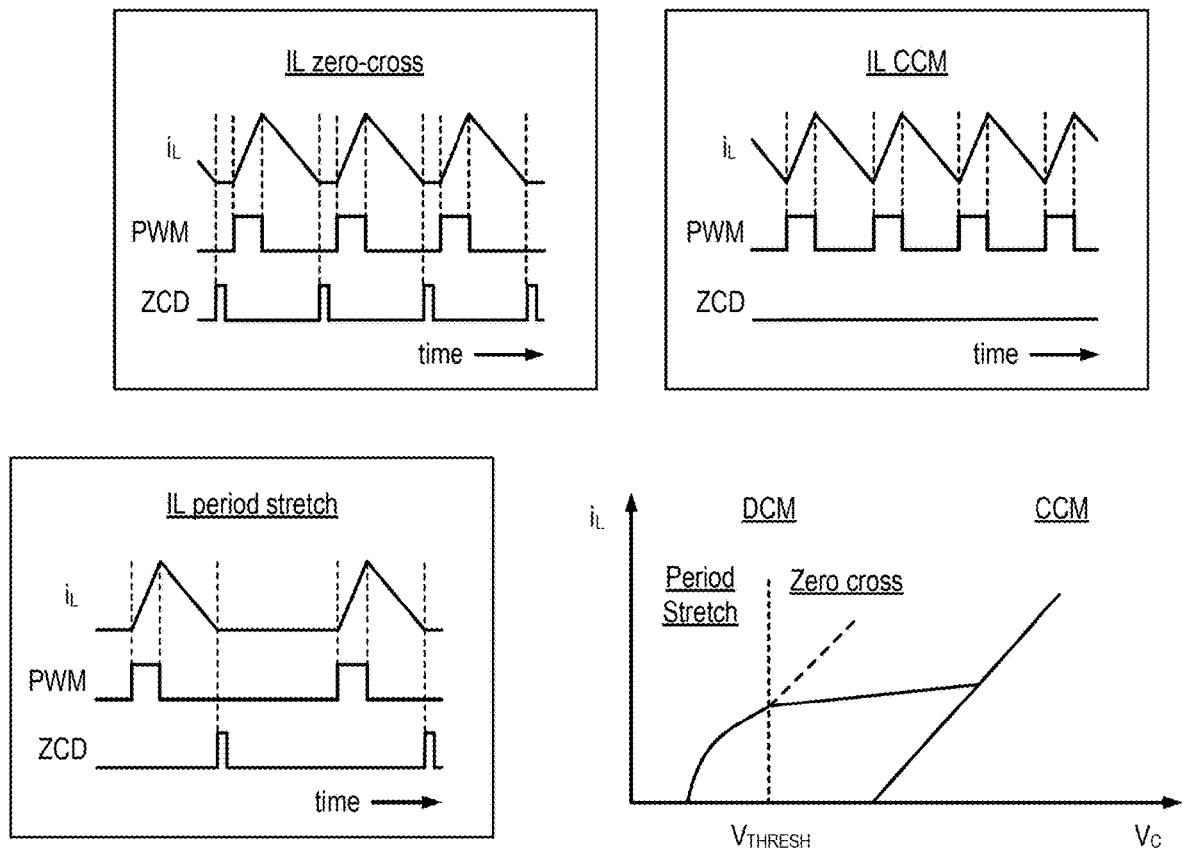
FIG. 3A is a plot of inductor current against control voltage.
Figure 3B:
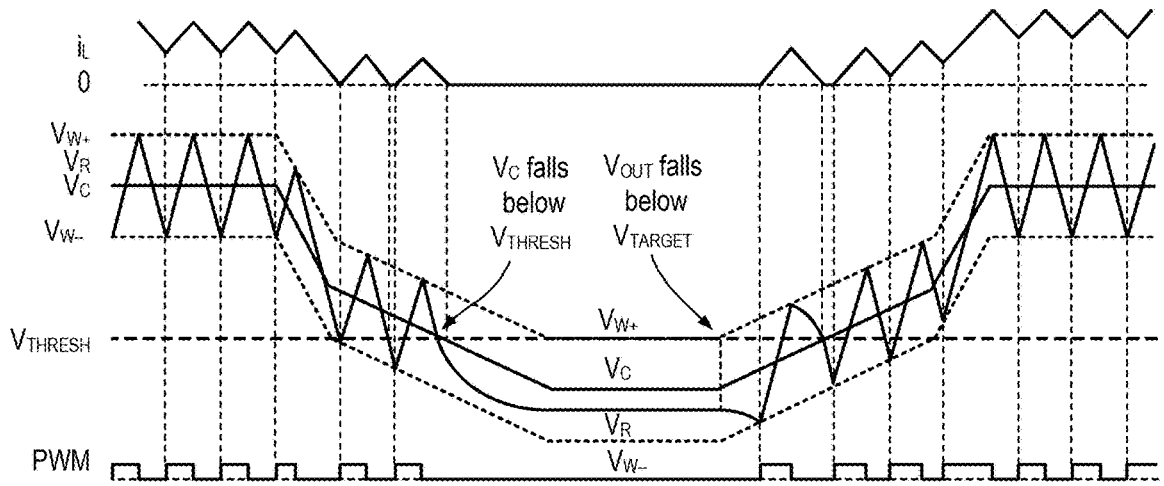
FIG. 3B illustrates discontinuous conduction mode (DCM) of operation.
Figure 3C:
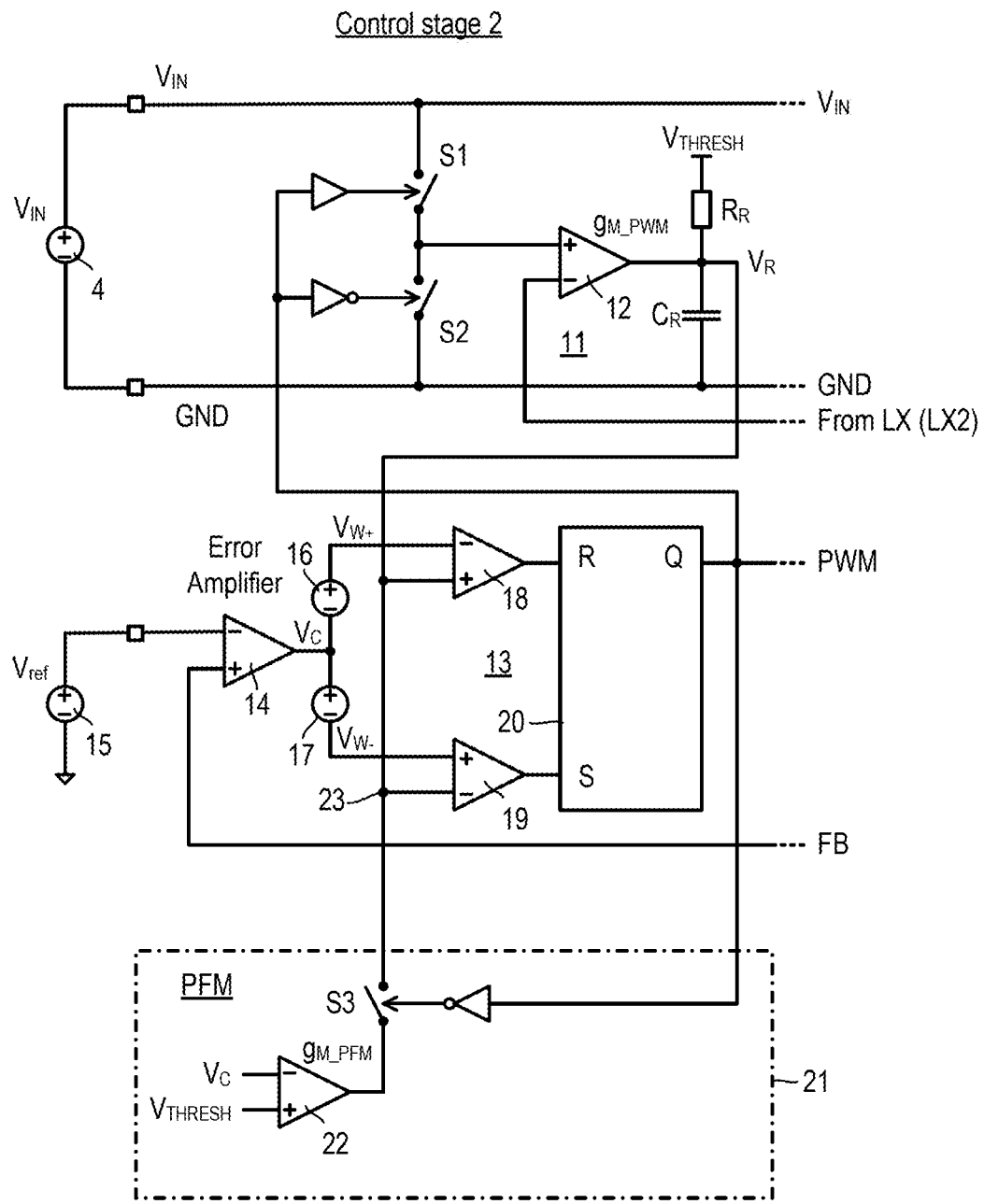
FIG. 3C is a circuit diagram of a DCM implementation.

Discontinuous Conduction Mode (DCM) operation. Referring to FIGS. 3A, 3B and 3C, in a hysteretic current mode control with synthesized current sense information, the Pulse Width Modulation (PWM) ramp is proportional to inductor current $i_L$ and the controller operates in Continuous Conduction Mode (CCM) mode when control signal $V_C$ is above a CCM threshold $V_{THRESH}$ (which may be, for example, 1.45 V). As the control signal $V_C$ falls below the CCM threshold $V_{THRESH}$, the falling edge slope of the ramp is progressively made shallower to allow period stretching in DCM.

Referring in particular to FIG. 3B, a new switching cycle (i.e., a rising edge of PWM) starts when the voltage ramp $V_R$ meets or crosses the lower window $V_{W-}$. Once the control voltage $V_C$ falls below a threshold value $V_{THRESH}$ (for example, 1.45 V), the slope of the voltage ramp $V_R$ decreases to zero and the voltage ramp $V_R$ does not cross the lower window and switching stops $V_{W-}$ and switching stops. When the output voltage $V_{OUT}$ falls below a target voltage $V_{TARGET}$, the control voltage $V_C$ starts rising from the threshold value $V_{THRESH}$ and this results in the ramp voltage $V_R$ starting to fall again. Once the ramp voltage $V_R$ meets or crosses the lower window threshold $V_{W-}$, a new switching cycle starts.

Referring in particular to FIG. 3A, period-stretching occurs as soon as zero-crossing is detected. In a non-ideal system, inductor current $I_L$ against control voltage $V_C$ exhibits three regions of operation, namely (1) CCM region in which in the inductor current operates in continuous conduction mode, (2) a zero-cross region in which the inductor current operates in discontinuous conduction mode, but at CCM the switching frequency and (3) a period stretch region in which inductor current operates in discontinuous conduction mode, while stretching the switching period. The inductor current may be not allowed to fall to zero.

Referring also to FIG. 1, the switches Q1, Q2 can have three states, namely:
State I: PWM=HIGH; ZCD latch is cleared
    Q1=ON and Q2=OFF resulting in the inductor current ramping up
State II: PWM=LOW; ZCD=LOW
    Q1=OFF and Q2=ON
State III: PWM=LOW; ZCD→LOW HIGH
    Q1=Q2=OFF resulting in inductor current held at zero Referring in particular to FIG. 3C, to achieve PFM control, a PFM control logic 21 is provided which includes a second transconductance amplifier 22 which receives the threshold voltage $V_{THRESH}$ at its non-inverting input and the control signal $V_C$ to its inverting signal. The output of the second transconductance amplifier 22 is fed via node 23 to the non-inverting input of the first comparator 18 and the inverting input of a second comparator 19 via a third switch S3 which is controlled by nPWM (PWM bar). When $V_C$ is above $V_{THRESH}$, the output of the second transconductance amplifier 22 is clamped to zero. When $V_C$ is below $V_{THRESH}$, the output of the second transconductance amplifier 22 is proportional to $g_{M\_PFM}(V_{IN}-V_{OUT})$. When PWM is HIGH, then S3 is OPEN and when PWM is LOW, then S3 is CLOSED. Thus, when $V_C$ falls below $V_{THRESH}$ and PWM is LOW, then the output causes $V_R$ to fall.

Figure 4:
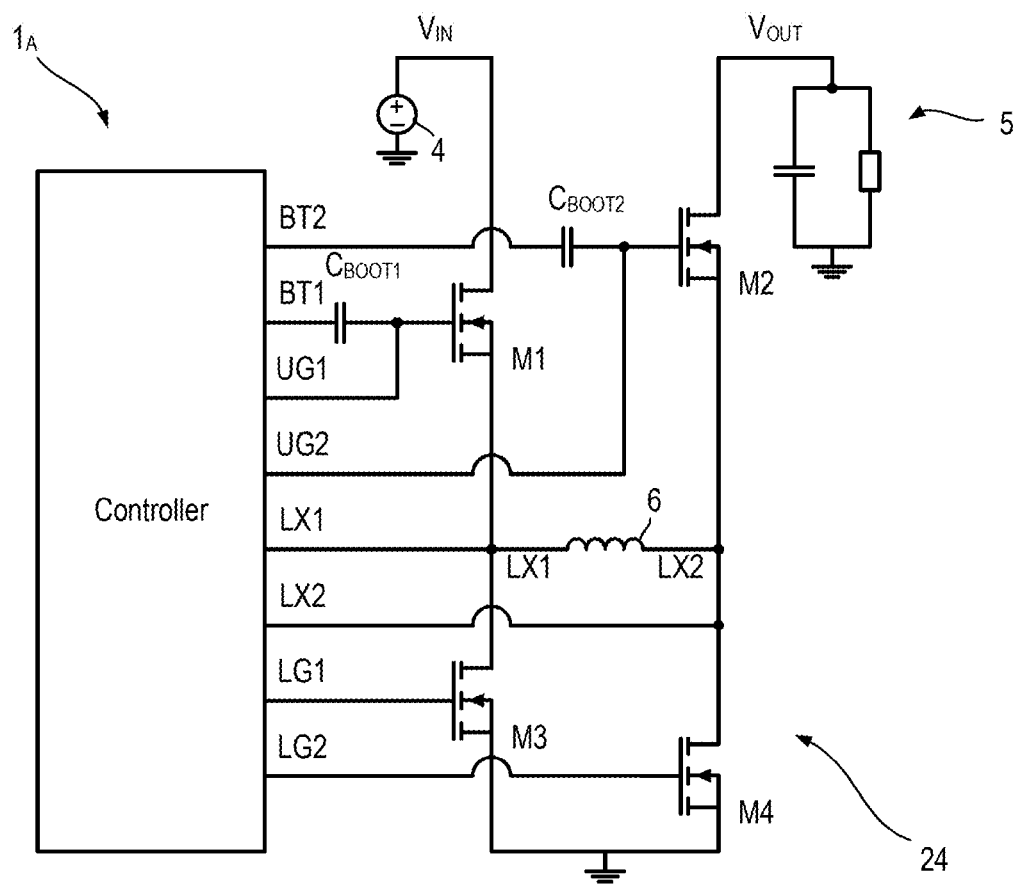
FIG. 4 is a circuit diagram of a hysteretic synthetic current buck-boost converter.

Hysteretic synthetic current buck-boost converter. Referring to FIG. 4, a buck-boost controller is shown which includes a power stage 24 which is off-chip. The power stage 24 includes first and second high-side NMOS switches M1, M2 and third and fourth low-side NMOS switches M3, M4. Use of NMOS for high-side switches M1, M2 needs bootstrapped gate drivers. One way of implementing this is to use boot strap capacitors $C_{BOOT1}$, $C_{BOOT2}$. These capacitors $C_{BOOT1}$, $C_{BOOT2}$ are topped-up during each switching cycle. A bootstrap capacitor $C_{BOOT1}$, $C_{BOOT2}$ provides a level-shifted supply source for a high-side switch M1, M2. The bootstrap capacitors $C_{BOOT1}$, $C_{BOOT2}$ are refreshed whenever the phase nodes LX1, LX2 switch.

Figure 5:
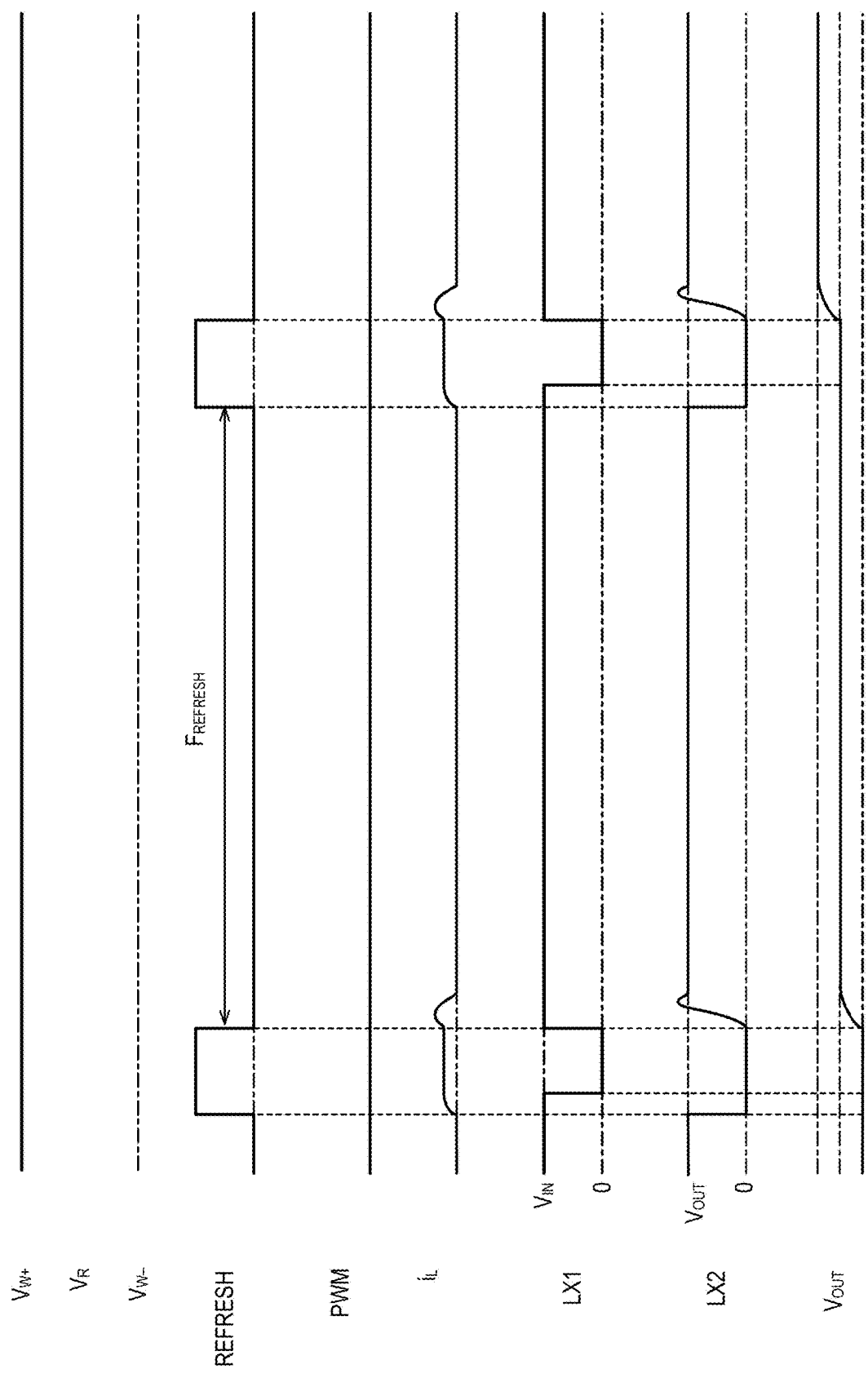
FIG. 5 is a timing chart illustrating boot refresh when there is no load for the buck-boost converter shown in FIG. 4.

Boot capacitor refresh cycles. Referring also to FIG. 5, when the load is light, the switching frequency drops very low. In between switching cycles, the bootstrap capacitors $C_{BOOT1}$, $C_{BOOT2}$ discharge.

Accordingly, after a period of inactivity, refresh cycles are added to top-up the boot capacitors $C_{BOOT1}$, $C_{BOOT2}$. During a refresh cycle, the phase nodes LX1, LX2 are pulled low for a finite around of time which allows the boot capacitors $C_{BOOT1}$, $C_{BOOT2}$ to re-charge. In boost mode operation, at the start of the refresh cycle, the low-side gate signal LG1 only turns on after the high-side gate signal UG1 is turned off and detected as off. Thus, the second phase node LX2 is pulled down first and so the input voltage $V_{IN}$ appears across the inductor L for about 30 to 40 ns thereby developing a positive current.

For the time after the refresh, when the first phase node LX1 is reconnected to the input voltage $V_{IN}$, it is only parasitic capacitance which holds the second phase node LX2 down. This causes energy to be put in the inductor L until the second phase node LX2 node voltage is equal to the first phase node LX1 voltage. The second phase node LX2 voltage keeps on rising until it is greater than the output voltage $V_{OUT}$ by a body diode voltage and the energy in the inductor is dumped to output. Thus, under no-load/light-load conditions, a rise in output voltage can occur. Audio band suppression (ABS). In DCM operation, as the load current is reduced, the switching frequency is reduced to maintain regulation. For loads below a certain value, the switching frequency can fall into the audio frequency range (i.e., 20 Hz to 20 kHz). One way of avoiding switching in audio range is to maintain a minimum load at the output and accept efficiency loss. The refresh cycles can be used to perform audio band suppression.

Figure 6:
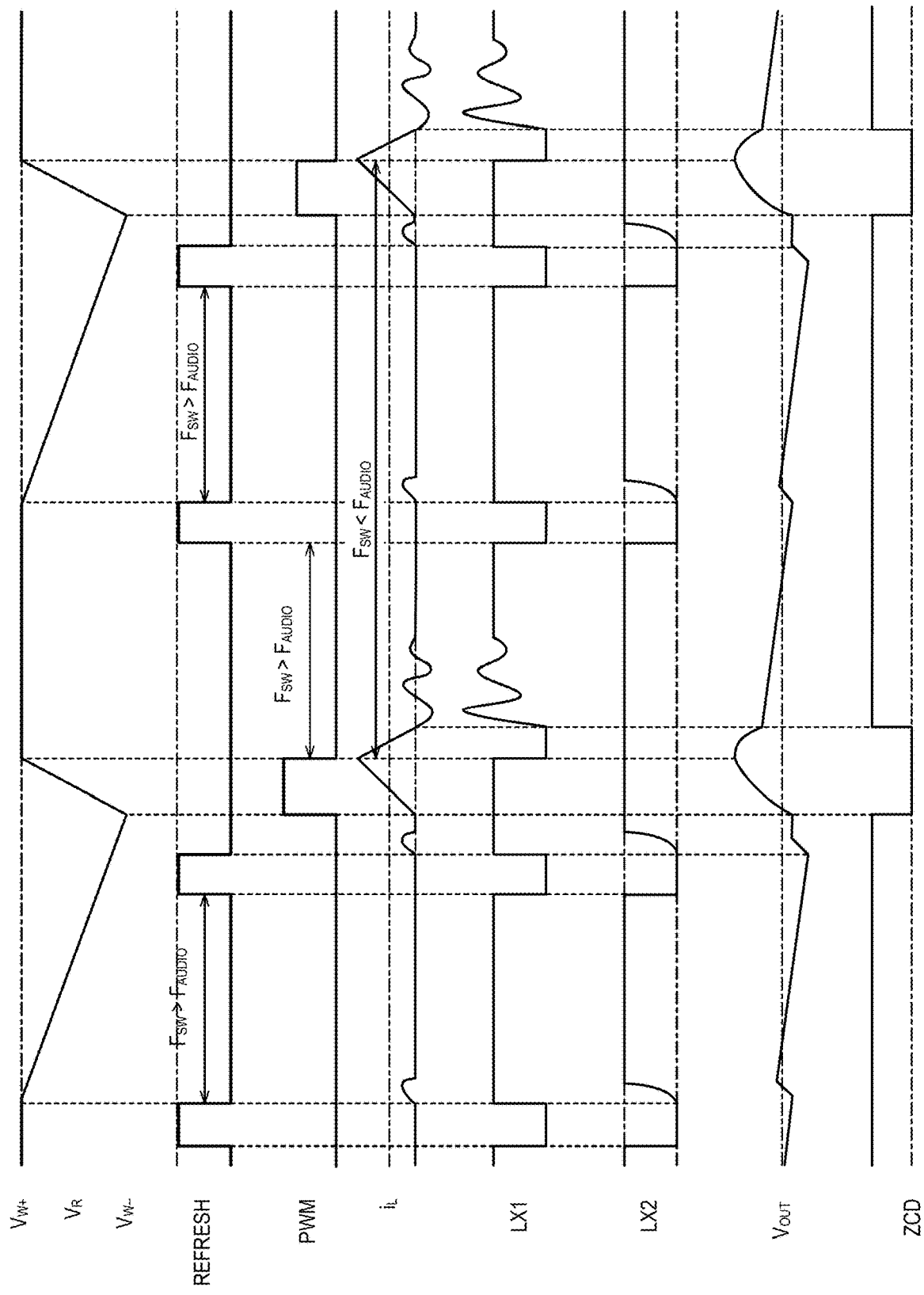
FIG. 6 is a timing chart illustrating audio band suppression for the buck-boost converter shown in FIG. 4.

Referring also to FIG. 6, if a switching cycle has not occurred for a period $1/F_{AUDIO}$ a refresh cycle is introduced. So, a phase node is always pulled down for period≤$1/F_{AUDIO}$. This implementation, however, has drawbacks. Even though both phase nodes LX1, LX2 are pulled down in a refresh cycle, much less energy is put in the inductor L compared to a normal PWM pulse. The period between cycles where there is significant energy in the inductor or output can be greater than $1/F_{AUDIO}$ resulting in audio noise. Also, as hereinbefore described, the small current pulses injected to the inductor L by refresh cycles can be net positive, driving the output higher.

Figure 7:
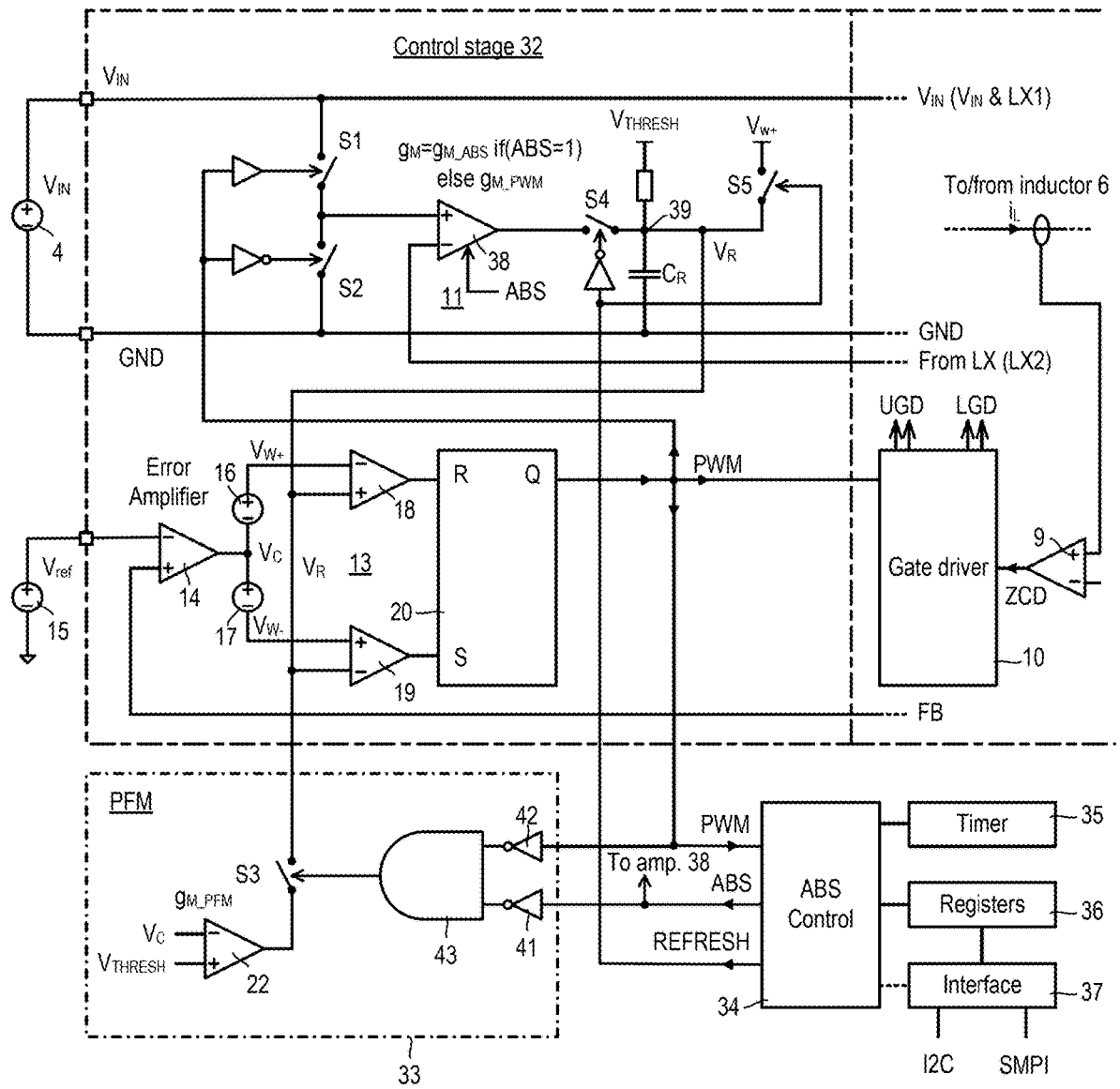
FIG. 7 is a circuit diagram of a system which includes a hysteretic synthetic ramp buck converter and controller for the buck converter.

Combining ABS and refresh cycles. Referring to FIG. 7, a power management system 31 is shown. The power management system 31 includes a control stage 32, the zero-crossing detector 9, gate driver 10, PFM control logic 33 and ABS control logic 36, which is provided with a timer unit 35, registers 36 and an interface 37. The control stage 32 is similar to the control stage 2 shown in FIG. 1, except that it employs variable gain transconductance amplifier 38 is used and additional switches S4, S5 are provided to provide additional control over the voltage ramp $V_R$ at node 39. In particular, a fourth switch S4 is interposed between the output of the transconductance amplifier 38 and the node 39 which is controlled by an active-low ramp-pull up signal, nREFRESH (or REFRESH bar). A fifth switch S5 is interposed between the upper window level voltage $V_{W+}$ and the node 39 is controlled by an active-high ramp-pull up signal, REFRESH.

The PFM control logic 33 includes first and second inverters 40, 41 which receive PWM and ABS, respectively. The PFM control logic 33 also includes a 2-input AND gate 42. The outputs of the inverters 40, 41 are fed as inputs into the AND gate 42. The output of the AND gate 42 controls the third switch S3. The ABS control block 34 receives PWM from the latch 20 and generates ABS and REFRESH signals. The control block 34 is provided with programmable registers 36 for specifying time periods.

As will be explained in more detail hereinafter, the power management system 31 can be modelled as a finite state machine (FSM) which includes a REFRESH state, an ABS state, one or more PWM cycle states (e.g., Buck ON, Buck OFF, Boost ON), and a Tri-state. The PWM cycle can also include a so-called "T2 period" which can be fixed or variable. Transitions between states occurs in response to REFRESH, ABS, PWM and ZCD signals. In different states, the gate driver 10 applies a suitable combination of gate drive signals UG, LG, UG1, UG2, LG1, LG2 to one or more pairs of high-side and low-side transistors M1, M2, M3, M4 which may be on-chip or off-chip (i.e., on the same chip as the control stage).

Figure 8:
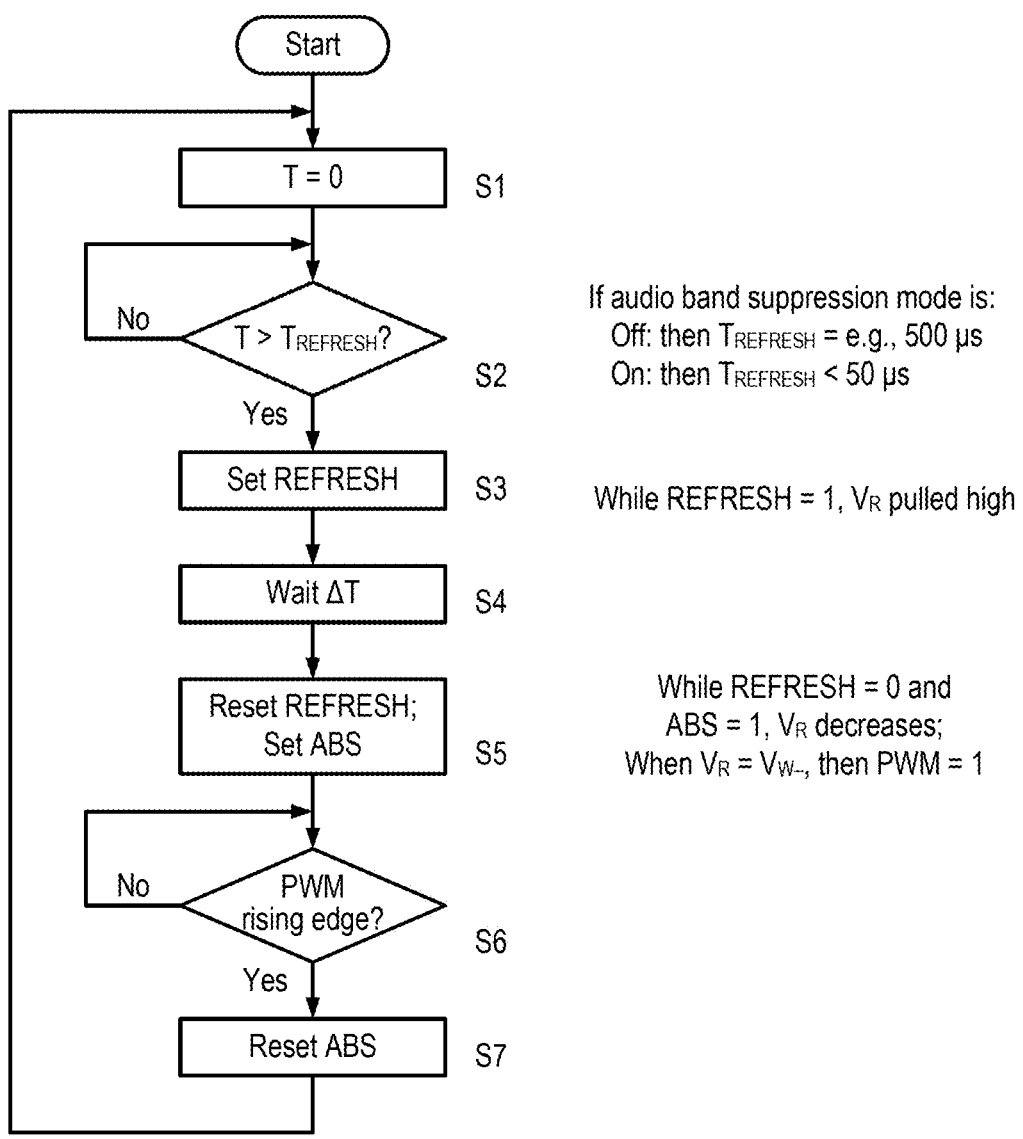
FIG. 8 is process flow diagram of controlling the buck converter.

Referring also to FIG. 8, operation of the ABS controller 34 will now be described. If there has been no PWM pulses for a period=$T_{REFRESH}$, then a refresh cycle starts by the controller 34 setting REFRESH (steps S1 & S2). During a refresh cycle, the ramp $V_R$ is pulled up and held close to or above the upper window $V_{W+}$. The controller 34 waits a period ΔT (step S4). After ΔT has elapsed, the controller 34 then resets REFRESH and sets ABS (steps S5). During ABS, the ramp $V_R$ falls at the rate proportional to output $V_O$. When the ramp $V_R$ falls below the lower window $V_{W-}$, the a new PWM cycle starts and ABS is reset (steps S6 and S7).

The ABS time is determined by the rate of fall of the ramp $V_R$. The gm amplifier gain is changed to $g_{M\_ABS}$ (herein also referred to as the "first transconductance amplifier gain value") during ABS to control the period of ABS and indirectly control the energy taken out of the output voltage $V_O$. This allows energy to be balanced. The energy taken out of the output during ABS is equal to the energy supplied to the output during a PWM cycle. In particular, the value of $g_{M\_ABS}$ is adjusted so that the energy (or charge) taken out from the inductor resulting from ABS is greater than or equal to the energy (or charge) returned resulting from a PWM cycle. Since energy (or charge) can be lost, typically the energy taken from the inductor will be higher (for example, between 0 and 20% higher) than the returned energy (or charge). However, if losses are insignificant, then the extracted energy (or current) is the same as the returned energy (or current). Thus, to achieve this, for buck or boost converters, $g_{M\_ABS}$ will take a value of at least twice $g_{M\_PWM}$ (i.e., $g_{M\_ABS} \leq 2 \cdot g_{M\_PWM}$). Herein, $g_{M\_PWM}$ is also referred to as the "second transconductance amplifier gain value"). For buck-boost converters, the energy (or charge) depends not only on $g_{M\_ABS}$, but also the duration of a T2 period between the end of ramp down and beginning of the PWM pulse.

The value of $g_{M\_ABS}$ can be adjusted, for example using trimming resistors, during testing in which energy into and out of the inductor is measured. This can be performed in factory (i.e., before use) or in place.

Figure 9:
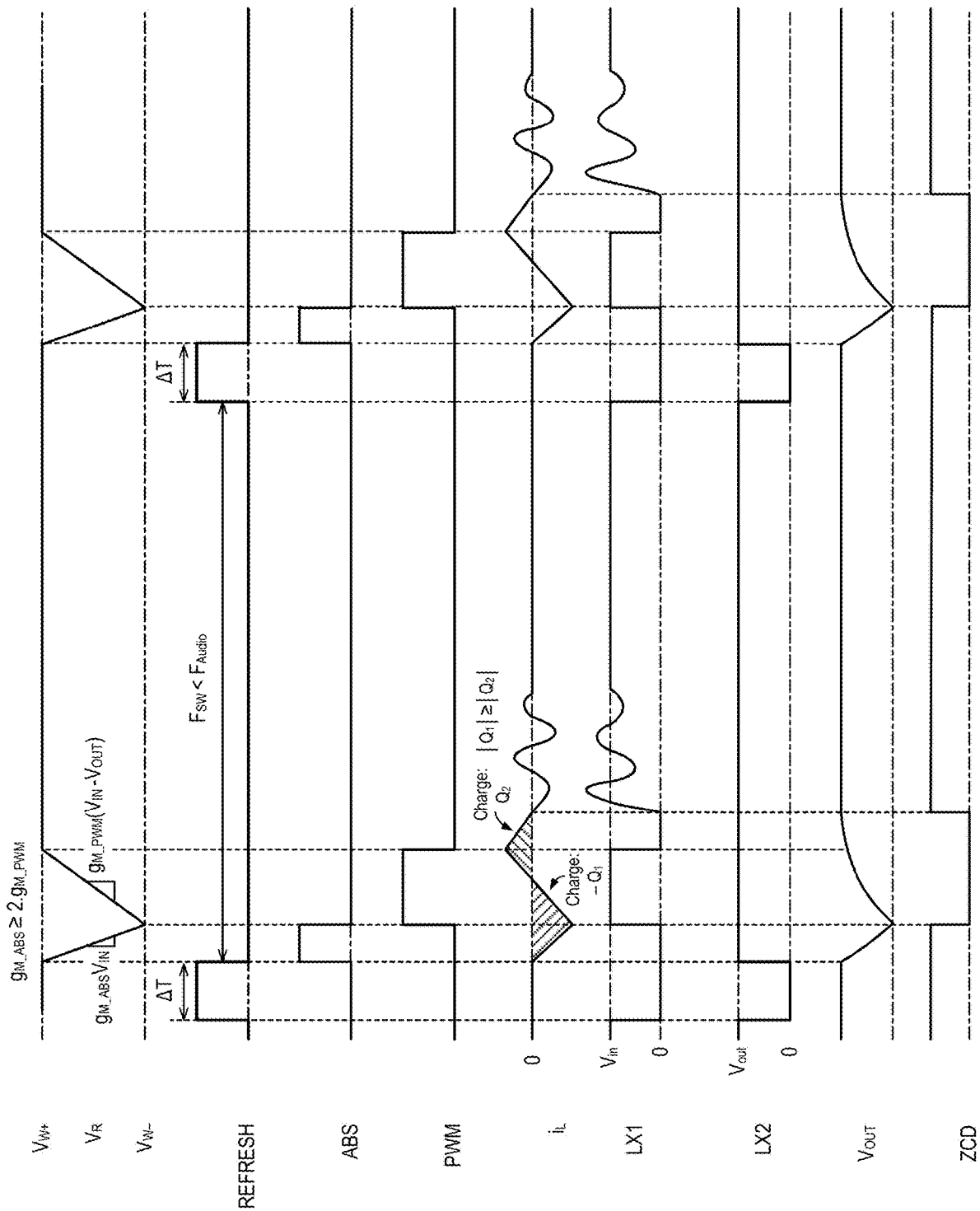
FIG. 9 is a timing chart illustrating bootstrap capacitor refresh cycle in the system shown in FIG. 7.

Refresh cycle. Referring to FIGS. 7 and 9, the power management system 31 can help avoid the output rising when there is no load or a very light load.

Immediately following a refresh cycle, during ABS, the inductor current $i_L$ is taken negative and then a PWM cycle starts. The duration of ABS is controlled by the window size and the ramp rate of synthetic ramp $V_R$. By adjusting the rate of the ramp (i.e., $g_{M\_ABS}$), the energy put into the inductor 6 can be controlled and the energy or charge taken out from the output can be indirectly controlled. This can be adjusted to cancel out the energy or charge dumped at the output during a refresh cycle.

As shown in FIG. 9 the shaded areas between zero current and inductor current $i_L$ is a measure of charge Q. Thus, the area or charge $Q_1$ taken out of the inductor 6 should be greater than or equal to the charge $Q_2$ returned. The time period during which charge $Q_1$ is extracted extends from the rising edge of ABS until the inductor current crosses zero, which follows after the rising edge of the PWM pulse. The time period during which charge $Q_2$ is returned extends from zero current crossing to the next zero crossing, which follows after the falling edge of the PWM pulse. The timing of the zero crossings are detected and signalled by ZCD.

Figure 10:
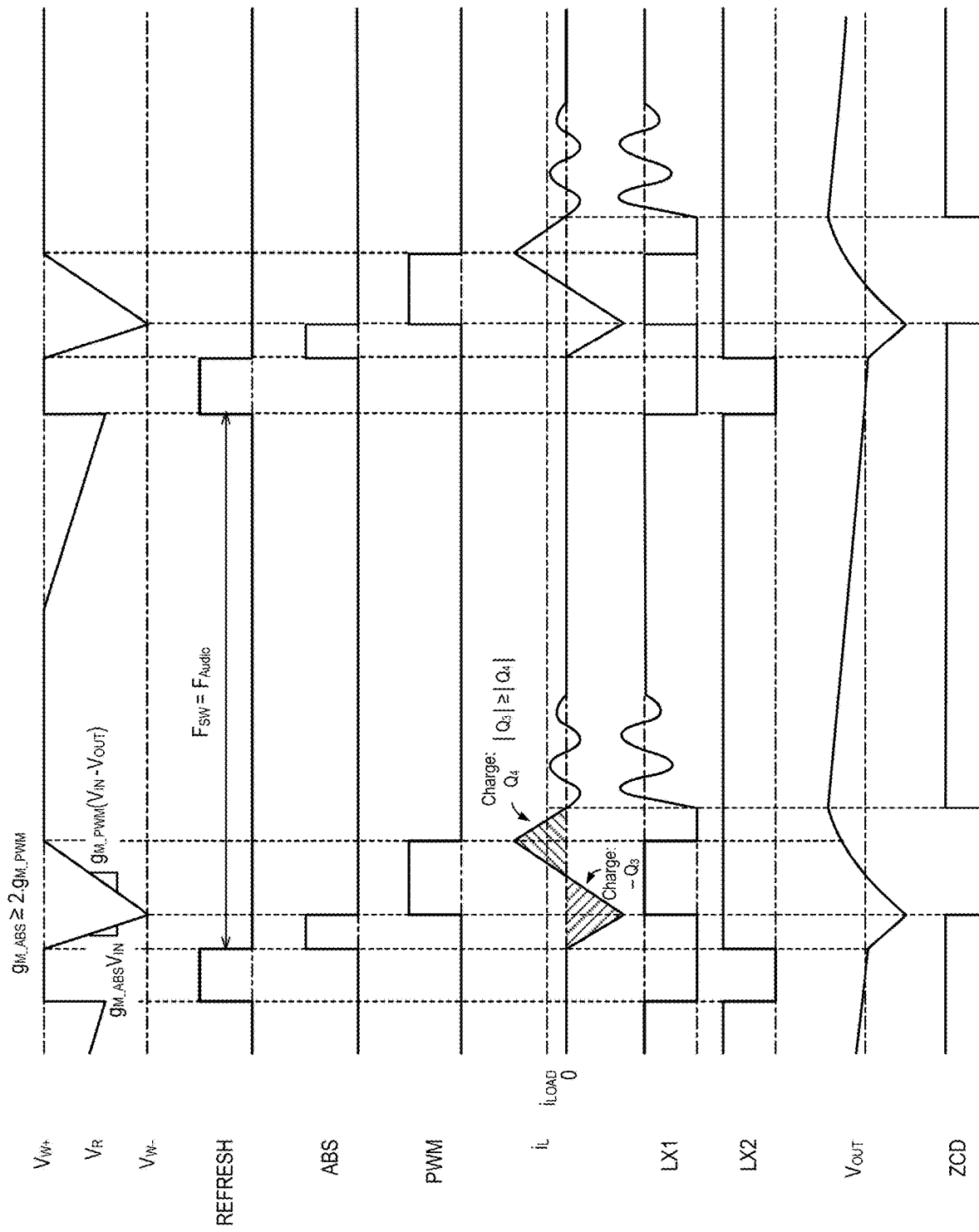
FIG. 10 is a timing chart illustrating audio band suppression in the system shown in FIGS. 11A, 11B and 11C illustrates simulation of a buck-boost hysteretic synthetic current converter in buck mode.

ABS. Referring to FIGS. 7 and 10, the power management system 31 can implement ABS. In particular, refresh cycles are introduced if there are no PWM cycles for a period equal to 1/(audio frequency). Thus, $T_{REFRESH}=1/$(audio frequency). Immediately following a refresh cycle, the inductor current is taken negative for an ABS cycle, followed by a PWM cycle. The duration of ABS is controlled by the window size and the ramp rate of synthetic ramp $V_R$. By adjusting the rate of the ramp $V_R$ during ABS (i.e., $g_{M\_ABS}$), the energy put into and taken out of the output can be balanced.

As shown in FIG. 10, the shaded areas between zero current and inductor current $i_L$ is a measure of charge Q.

Thus, the area or charge $Q_3$ taken out of the inductor 6 should be greater than or equal to the charge $Q_4$ returned. The time period during which charge $Q_3$ is extracted extends from the rising edge of ABS until the inductor current crosses zero, which follows after the rising edge of the PWM pulse. The time period during which charge $Q_4$ is returned extends from zero current crossing to the next zero crossing, which follows after the falling edge of the PWM pulse. The timing of the zero crossings are detected and signalled by ZCD.

Simulation results. A top-level simulation is performed for a buck-boost hysteretic synthetic current converter in ABS mode of operation. Cadence Virtuoso (RTM) is used as the simulation software. When the REFRESH signal is high, $V_R$ is pulled high. ABS is set on the negative edge of REFRESH. This starts a negative inductor current cycle. ABS is terminated by a PWM pulse. The rate of REFRESH determines if it is an ABS cycle. The amount of energy taken out from the output during an ABS cycle is greater than or equal to the energy put back in the following PMW cycle. This helps to ensure that output do not rise even under no-load conditions.

Figure 11A:
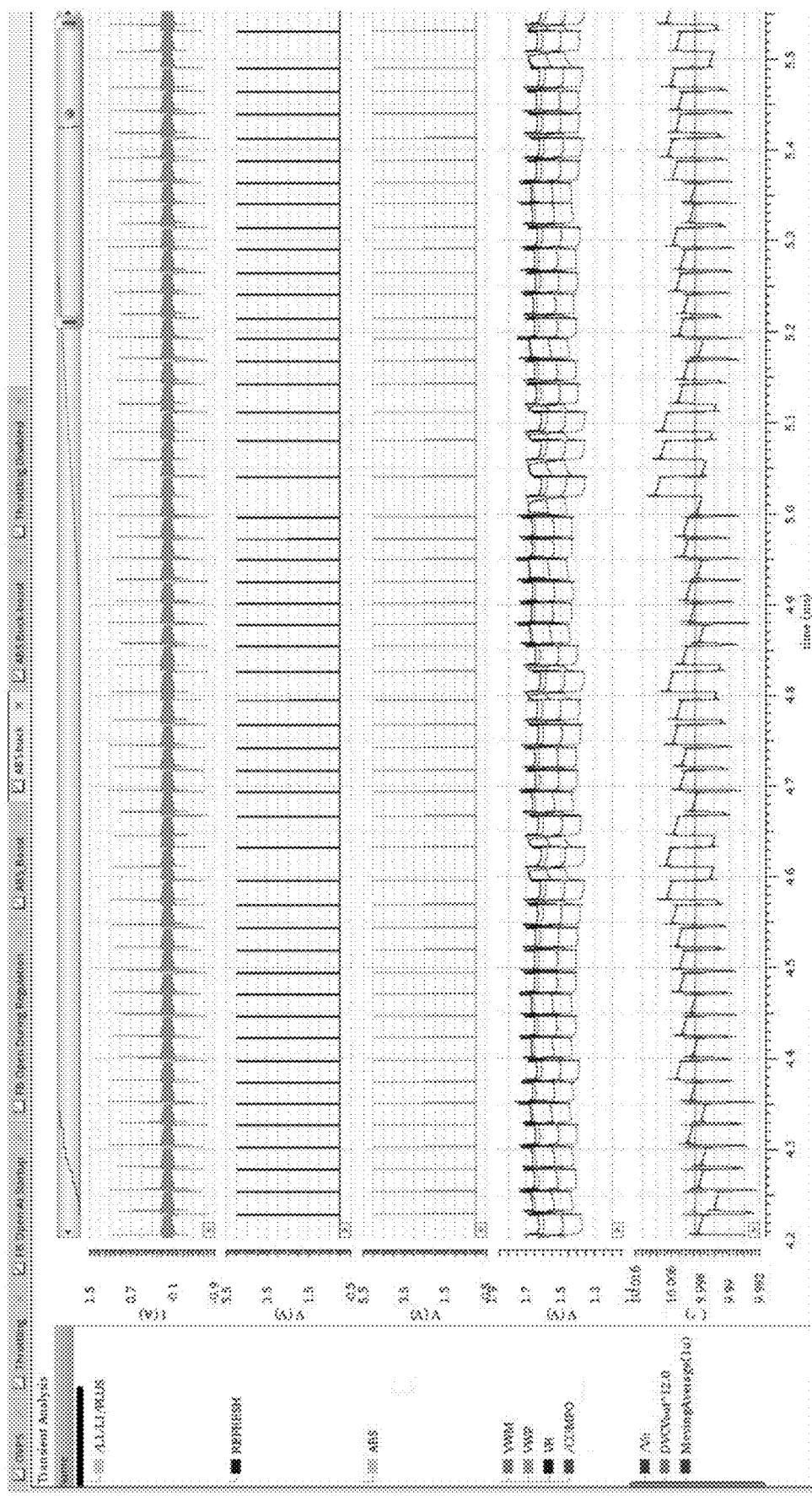

Buck mode. Referring to FIGS. 11A, 11B and 11C, if there are no PWM cycles within a period $1/F_{AUDIO}$, then a refresh cycle is issued. During REFRESH, the internal synthetic ramp $V_R$ is pulled up and clamped above the upper window VWP (or "$V_{W+}$"). The falling edge of REFRESH triggers an ABS cycle. During ABS, the converter issues a buck off cycle: the ramp $V_R$ is released and falls at a rate proportional to output voltage $V_O$. The inductor current $i_L$ also falls at the rate proportional to output voltage $V_O$. As soon as the ramp $V_R$ falls below the lower hysteretic window VRM (or "$V_{W-}$"), the PWM pulse goes high. The rise in PWM terminates the ABS pulse. The PWM starts a buck on cycle and when the ramp V rises above the upper window VWP, the buck on cycle is terminated. The fall in the PWM pulse starts a buck off cycle and is terminated by a zero crossing, i.e., ZCD going HIGH.

Figure 12A:
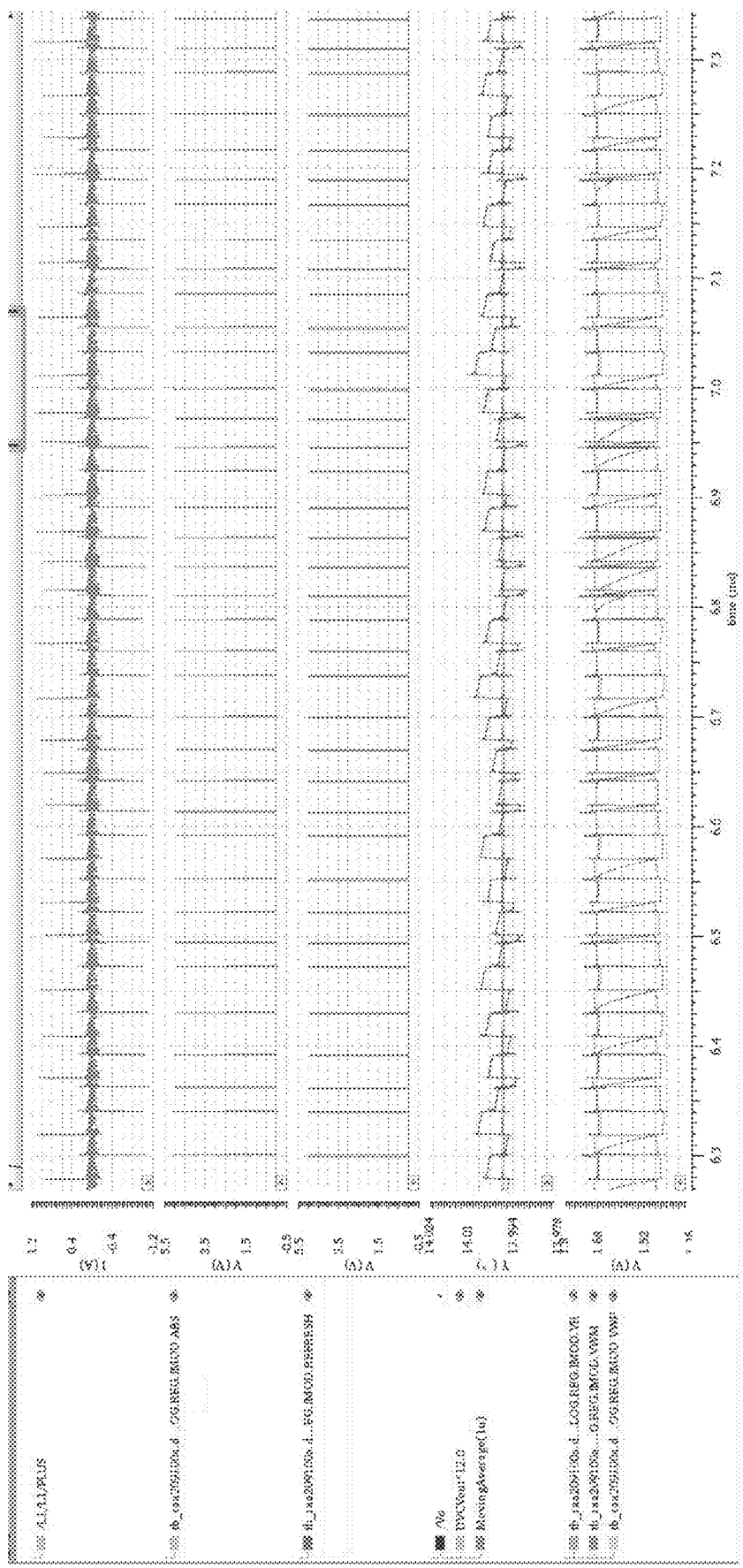
FIGS. 12A, 12B and 12C illustrates simulation of a buck-boost hysteretic synthetic current converter in boost mode.
Figures 12B, 12C:
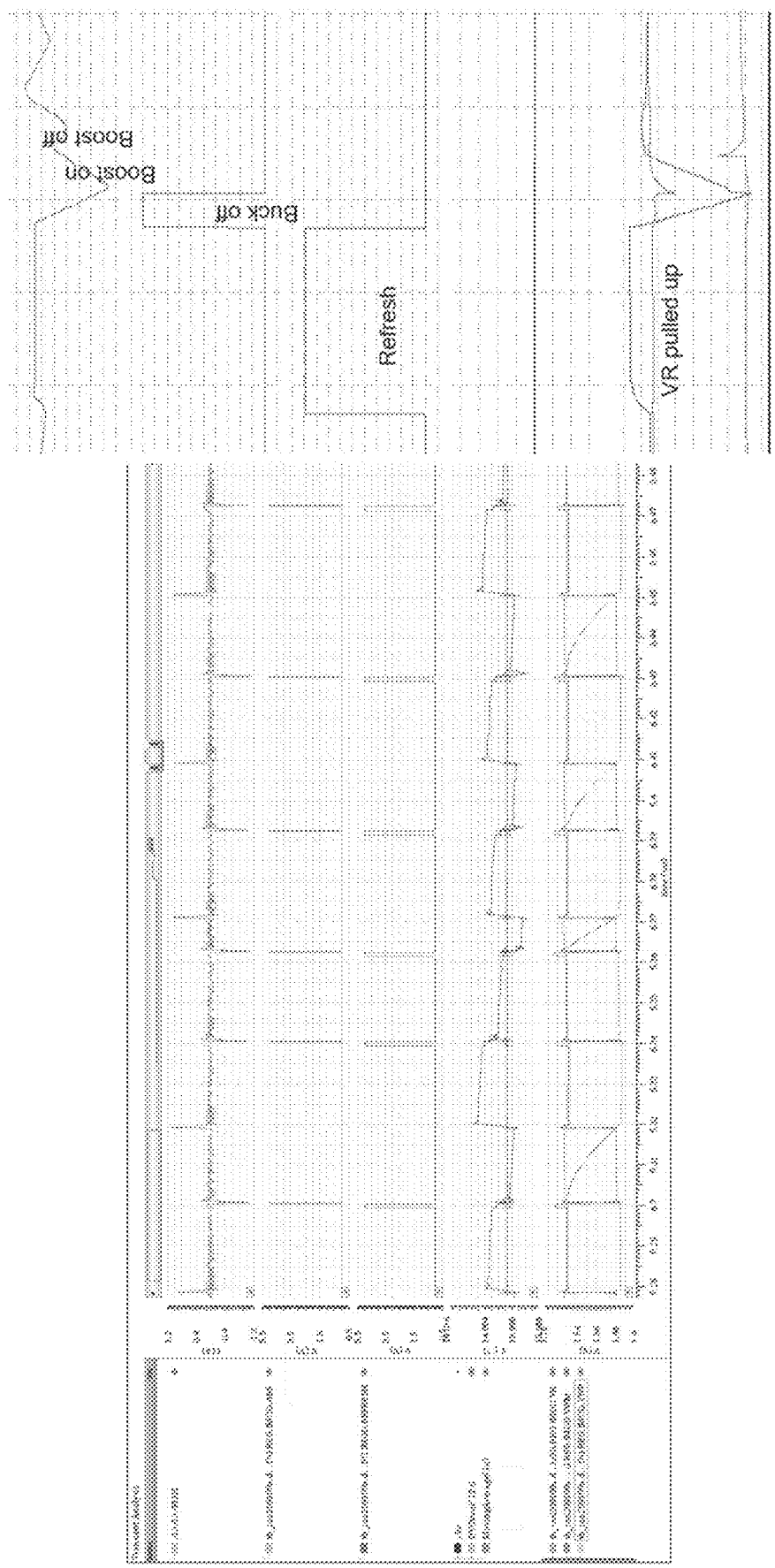

Boost mode. Referring to FIGS. 12A, 12B and 12C, during REFRESH, the ramp $V_R$ is pulled up and clamped above the upper window VWP. This is followed by an ABS cycle. During ABS, the converter issues a buck off cycle and the ramp $V_R$ is released. The ramp $V_R$ falls at a rate proportional to output voltage $V_O$. The inductor current $i_L$ also falls at the rate proportional to output voltage. As soon as the ramp $V_R$ falls below the lower hysteretic window VRM, the PWM pulse goes high. PWM going high terminates ABS pulse. The PWM starts a boost on cycle and when the ramp $V_R$ rises above the upper window VWP, it terminates the boost on cycle. The PWM pulse going low starts boost off cycle and boost of cycle is terminated by ZCD going HIGH.

Figure 13A:
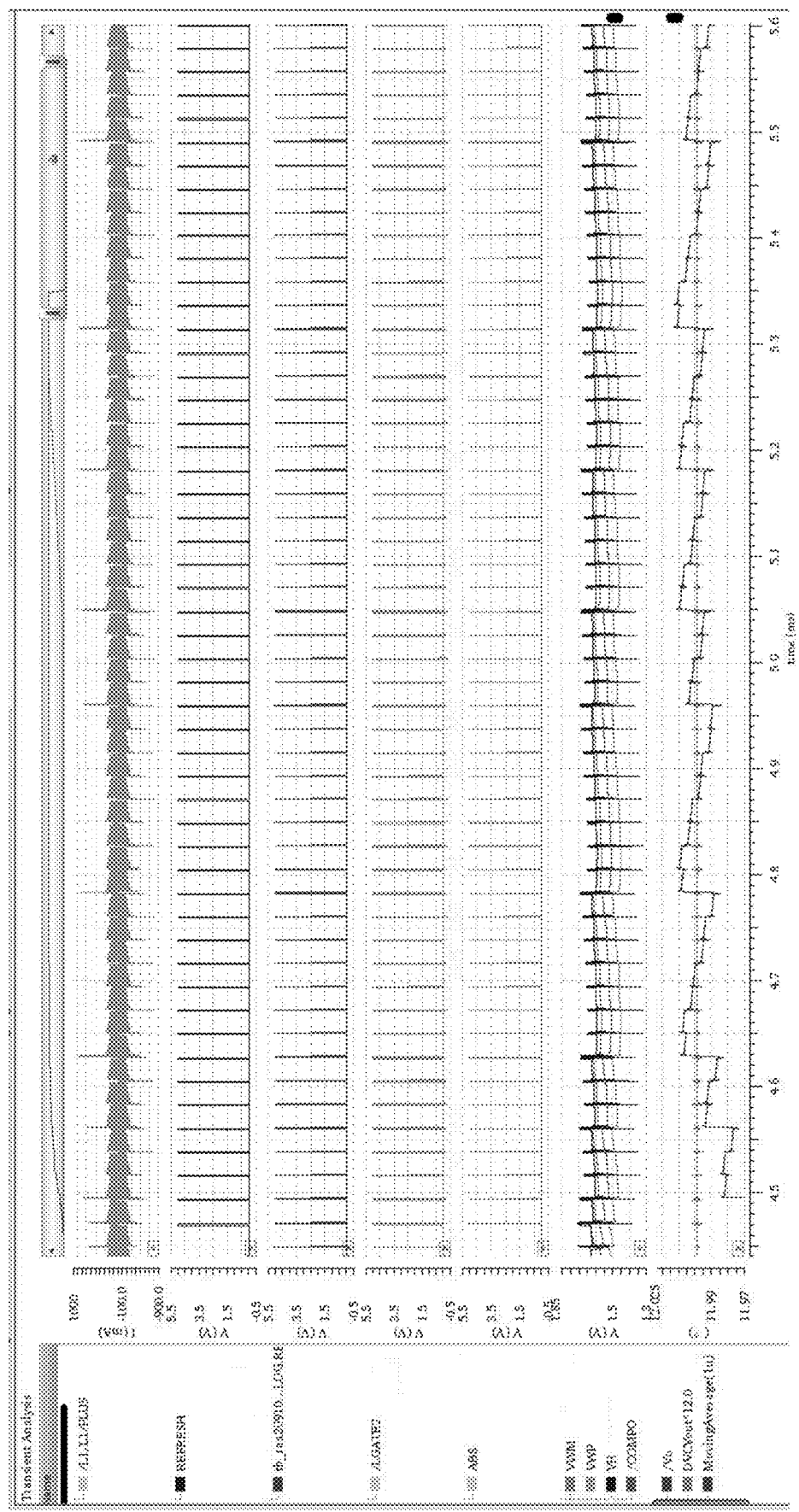
FIGS. 13A, 13B and 13C illustrates simulation of a buck-boost hysteretic synthetic current converter in buck mode.
Figures 13B, 13C:
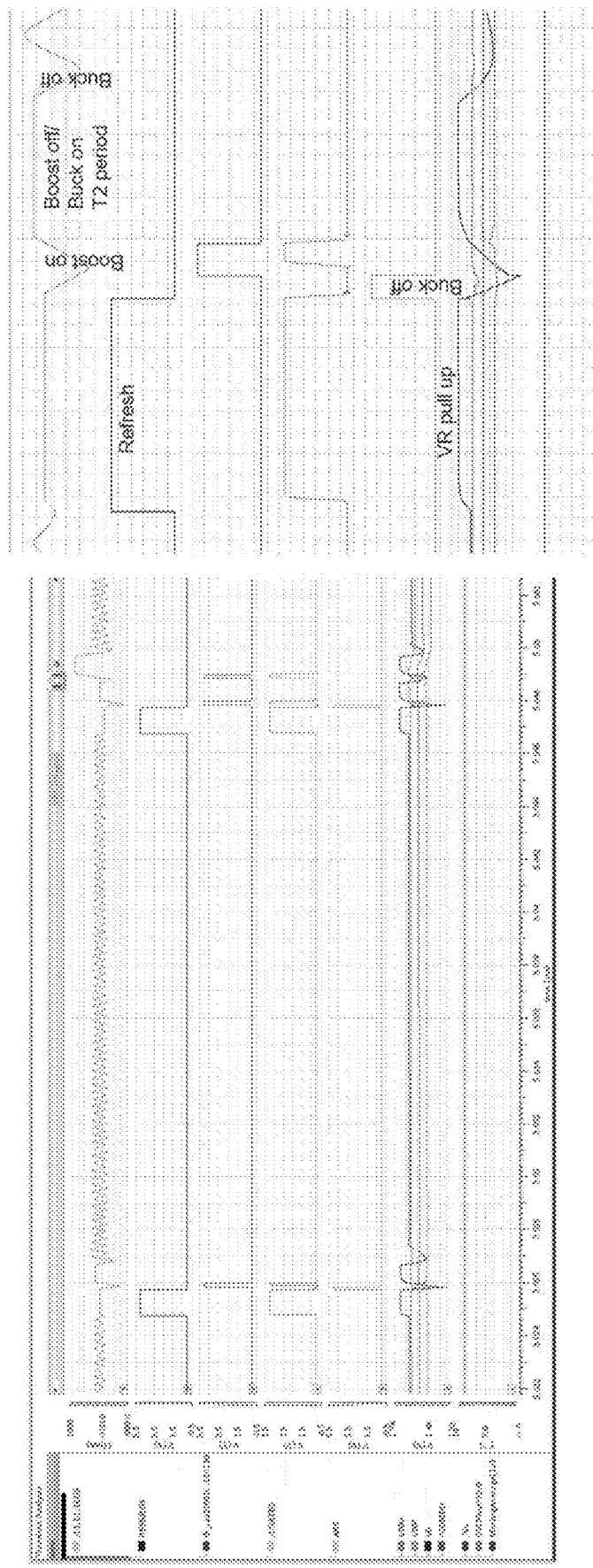

Buck-boost Mode. Referring to FIGS. 13A, 13B and 13C, during REFRESH, the ramp $V_R$ is pulled up and clamped above the upper window VWP. This is followed by an ABS cycle. During ABS, the converter issues a buck off cycle. During ABS, the ramp $V_R$ is released, and it falls at a rate proportional to output voltage $V_O$. The inductor current also falls at the rate proportional to output voltage. The ramp $V_R$ falls below lower hysteretic window VRM and generates a PWM pulse. The PWM pulse terminates ABS pulse. The PWM starts boost on cycle and when the ramp $V_R$ rises above the upper window VWP, the boost on cycle is terminated.

In 3-phase buck boost mode, at the end of boost-on phase, the controller enters the boost off phase for a fixed period T2. For light load currents, the ramp $V_R$ is clamped above upper hysteretic window during the T2 phase. After the fixed period T2, a buck off cycle is initiated and it is terminated by ZCD.

Switching regulators. REFRESH and ABS control as hereinbefore described can be used in a variety of different switching regulators. For example, a switching regulator may take the form of a power controller IC (which does not include an on-chip power transistors), a power converter (which includes a controller and on-chip power transistors, but not an on-chip inductor) or a power module (which includes the controller, on-chip power transistors and an on-chip inductor). Furthermore, a switching regulator may be a buck converter, a boost converter or a buck-boost converter.

Figure 14:
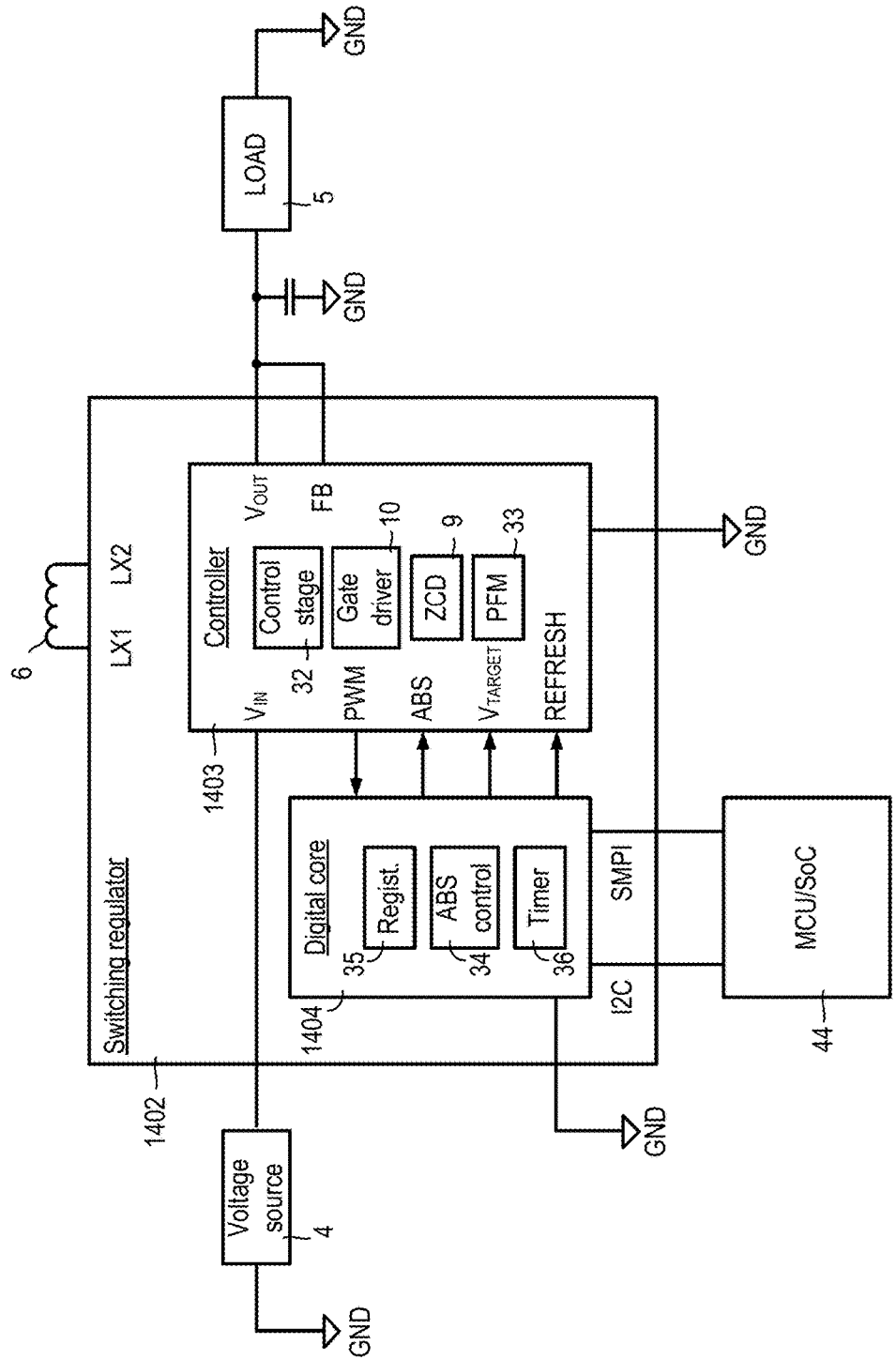
FIG. 14 is a schematic block diagram of a buck-boost converter.

Buck-boost converter. Referring to FIG. 14, a first power management system 1401 is shown. The power management system 1401 includes a switching regulator 1402 in the form of a buck-boost converter 1402 having an off-chip inductor 6. The switching regulator 1402 includes a controller 1403 and a digital core 1404. The controller 1403 includes a control stage 31 and a power stage (not shown) which includes a zero-crossing detector 9, a gate driver 10 and a control stage 32 and PFM control logic 33 as hereinbefore described. The digital core 1404 includes the ABS control 34, registers 35 and timers 36. The digital core 1404, including operation of ABS control 34, can be controlled via I2C and SMPI bus interfaces by a host 44 for example in the form of microcontroller or system-on-a-chip (SoC).

The controller 1403 generates the ramp $V_R$, the window voltages, $V_{W+}$, $V_{W-}$ and controls transition between PWM and PFM modes. The digital core 1404, generates ABS and REFRESH signals. The digital core 1404 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration $\Delta T$, starting REFRESH→ABS→PWM state transitions. If audio band suppression mode is switched off, then the refresh time $T_{REFRESH}$ is set to the maximum time that a bootstrap can hold charge, typically about 500 μs. If audio band suppression is switched on, then a shorter refresh time $T_{REFRESH}$ is used, in particular to being less than or equal to 50 μs (50 μs corresponds to 20 kHz).

Figure 15:
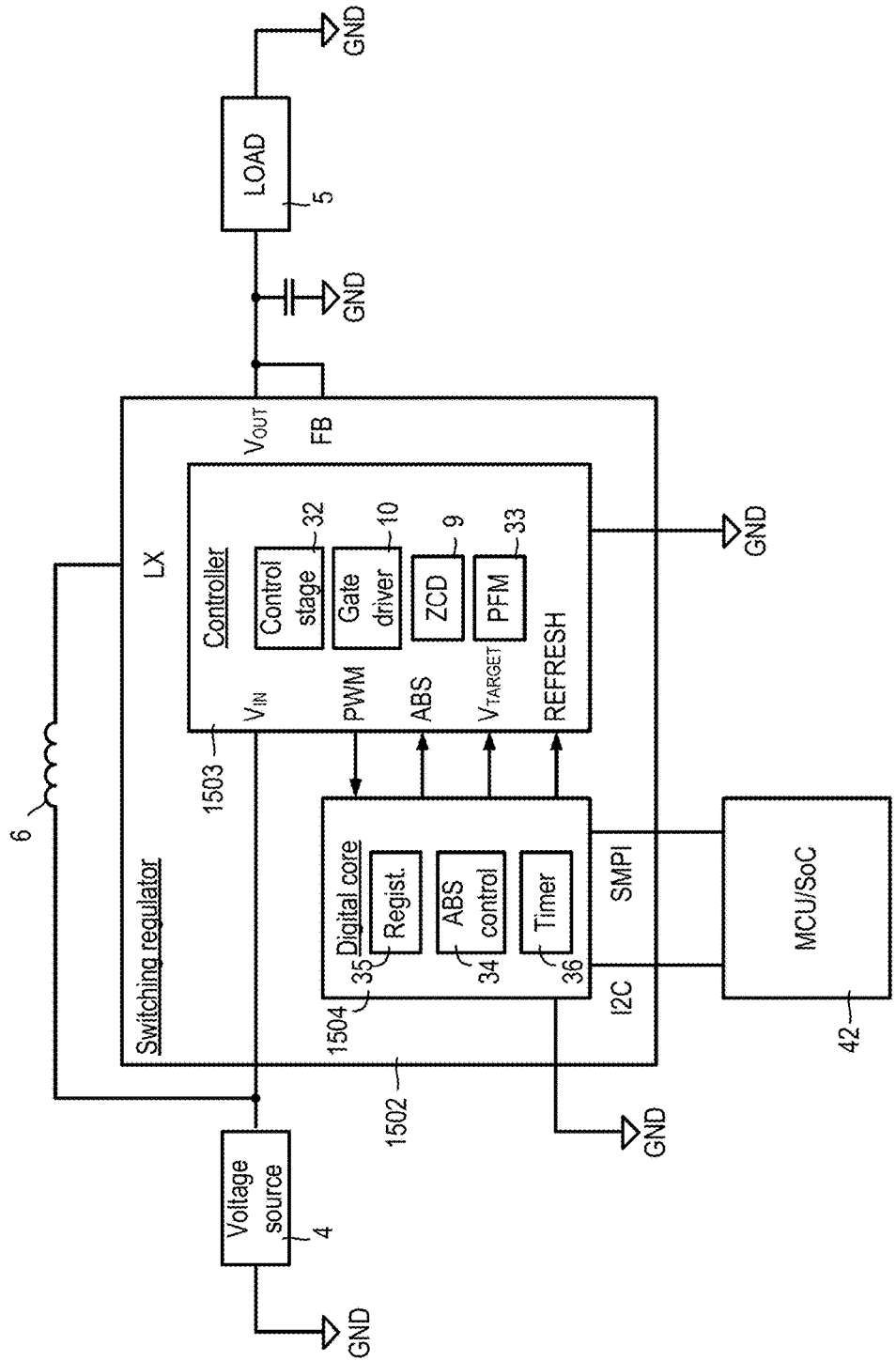
FIG. 15 is a schematic block diagram of a buck-boost converter.

Boost converter. Referring to FIG. 15, a second power management system 1501 is shown. The power management system 1501 includes a switching regulator 1502 in the form of a boost converter 1502 having an off-chip inductor 6. The switching regulator 1502 includes a controller 1503 and a digital core 1504. The controller 1503 includes a control stage 31 and a power stage (not shown) which includes a zero-crossing detector 9, a gate driver 10 and a control stage 32 and PFM control logic 33 as hereinbefore described. The digital core 1404 includes the ABS control 34, registers 35 and timers 36. The digital core 1504, including operation of ABS control 34, can be controlled via I2C and SMPI bus interfaces by a host 44 for example in the form of microcontroller or SoC.

The controller 1503 generates the ramp $V_R$, the window voltages, $V_{W+}$, $V_{W-}$ and controls transition between PWM and PFM modes. The digital core 1504, generates ABS and REFRESH signals. The digital core 1504 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration ΔT, starting REFRESH→ABS→PWM state transitions. If audio band suppression mode is switched off, then the refresh time $T_{REFRESH}$ is set to the maximum time that a bootstrap can hold charge, typically about 500 μs. If audio band suppression is switched on, then a shorter refresh time $T_{REFRESH}$ is used, in particular to being less than or equal to 50 μs.

Figure 16:
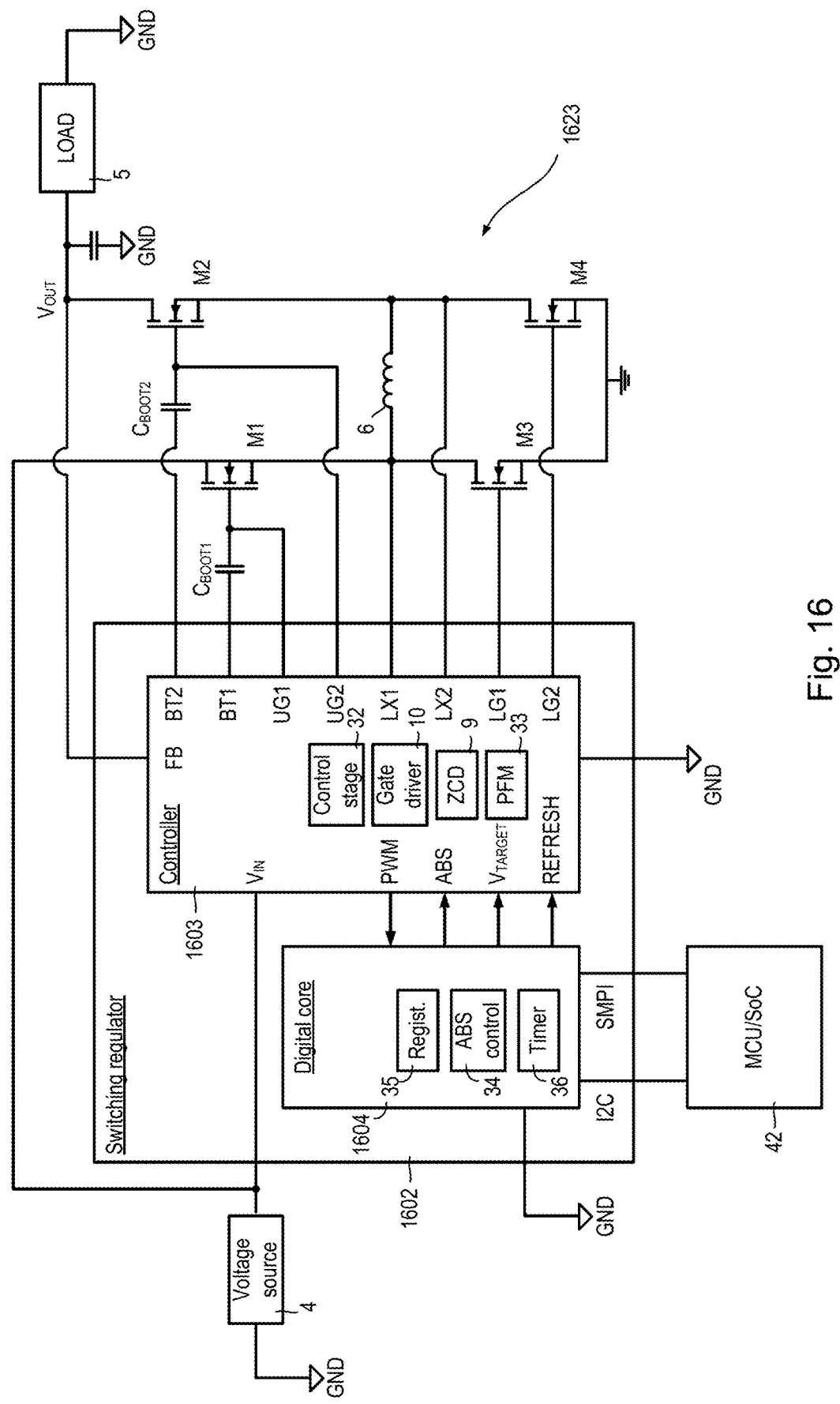
FIG. 16 is a schematic block diagram of a boost converter.

Buck-boost converter with external power transistors and bootstrap capacitors. Referring to FIG. 16, a third power management system 1601 is shown. The power management system 1601 includes a switching regulator 1602 in the form of a boost converter 1602 having an off-chip inductor 6. The switching regulator 1602 includes a controller 1603 and a digital core 1604. The controller 1603 includes a zero-crossing detector 9, a gate driver 10 and a control stage 32 and PFM control logic 33 as hereinbefore described. The digital core 1404 includes the ABS control 34, registers 35 and timers 36. The power stage 1623 is off-chip and includes first and second high-side NMOS switches M1, M2 and third and fourth low-side NMOS switches M3, M4. The power stages 1623 include bootstrap capacitors $C_{BOOT1}$, $C_{BOOT2}$. The digital core 1604 can be controlled via I2C and SMPI bus interfaces by a host 44 for example in the form of microcontroller or SoC.

The controller 1603 generates the ramp $V_R$, the window voltages, $V_{W+}$, $V_{W-}$ and controls transition between PWM and PFM modes. The digital core 1604, generates ABS and REFRESH signals. The digital core 1604 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration ΔT, starting REFRESH→ABS→PWM state transitions. If audio band suppression mode is switched off, then the refresh time $T_{REFRESH}$ is set to the maximum time that a bootstrap can hold charge, typically about 500 μs. If audio band suppression is switched on, then a shorter refresh time $T_{REFRESH}$ is used, in particular to being less than or equal to 50 μs.

ABS. Referring to FIGS. 16 and 17, the ABS "buck off" phase is timed to build up a negative inductor current which, in combination with the following PWM pulse so as to give an overall negative current contribution to the output. This can help prevent ABS pulses from over-charging the output when no load is present. FIGS. 18A to 18C give more details of the PWM cycle for buck operation. FIG. 18A is a state diagram 1800 for the buck-boost controller shown in FIG. 16.

Referring to FIGS. 16 and 18A to 18C, state transitions for a buck-boost controller operating in the buck mode will now be described. In CCM mode, the inductor current is continuous. Starting from Buck-OFF state 1801, when PWM goes high, the FSM transitions to Buck-ON state 1802. Inductor current ramps up. When PWM goes low, the FSM transitions to Buck-OFF state 1801 and inductor current decreases. This state transition continues as long as inductor current is above zero. In the Buck-OFF state 1801, if the inductor current crosses zero, then ZCD goes high. If the PWM is low and ZCD is high, then the FSM transitions to tristate 1803. The PWM signal has higher priority over ZCD. The system will remain in Tri-state 1803 until either PWM or REFRESH goes high. If the load is moderate, then REFRESH will not go high. This is PFM mode (DCM mode) of operation. In the PFM mode, FSM transitions between Buck-ON 1801, Buck-OFF 1802 and Tri-state 1803. PWM has higher priority over REFRESH.

If the load is light, then in the Tri-state 1803, REFRESH can go high. REFRESH high causes a transition to Refresh state 1804. After a period has elapsed in the Refresh state 1804, ABS goes high. ABS going high cause the state machine to transition from Refresh state 1804 to ABS state 1805. In the ABS state 1805, the current in the inductor ramps down. Since the current in the inductor during the Refresh state 1804 is zero, on entry from Refresh state 1804 to ABS state 1805, the current in the inductor goes negative and keeps ramping negative until the PWM signal goes high. When PWM goes high, FSM transitions from ABS state 1804 to Buck-ON state 1801. Thus, during REFRESH cycles, the FSM transitions between Buck-ON, Buck-OFF, Tristate, Refresh & ABS states 1801, 1802, 1803, 1804, 1805.

FIG. 18B shows simulated inductor current as a function of time. FIG. 18B is magnified view of FIG. 11C and additionally shows the state of the simulated buck-boost controller. FIG. 18B shows transitioning of the buck-boost controller from Refresh state 1804 to ABS state 1805 in response to ABD, and transitioning to Buck-ON state 1801 and to Buck-OFF state 1802 in response to PWM (not shown) and nPWM (not shown) respectively. FIG. 18C is a table which show the gate drive signals UG1, LG1, UG2, LG2 when the buck-boost controller is in each state.

Figure 25:
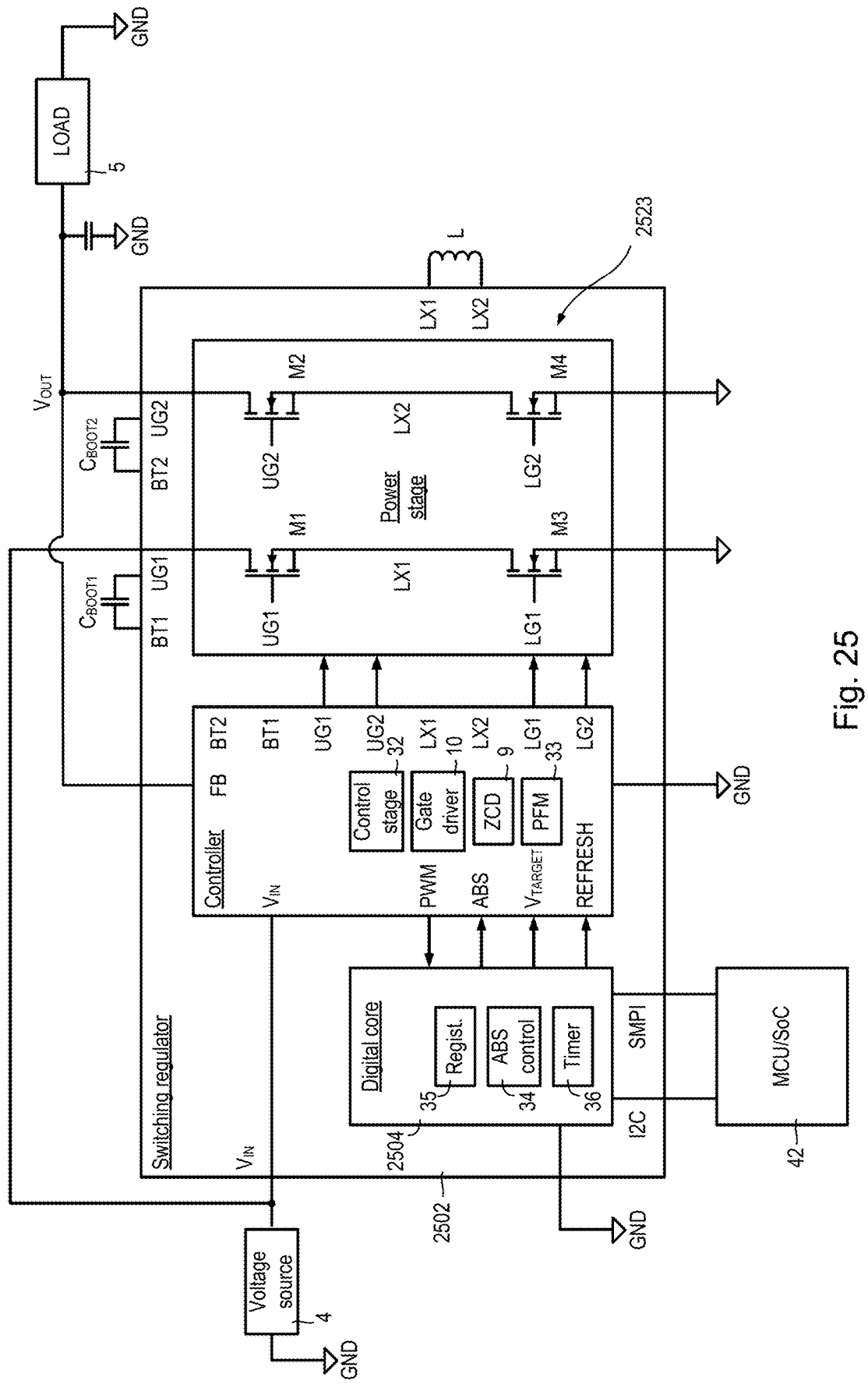
FIG. 25 is a schematic block diagram of a buck-boost converter comprising a power controller IC and off-chip FETs and bootstrap capacitors.
Figure 26:
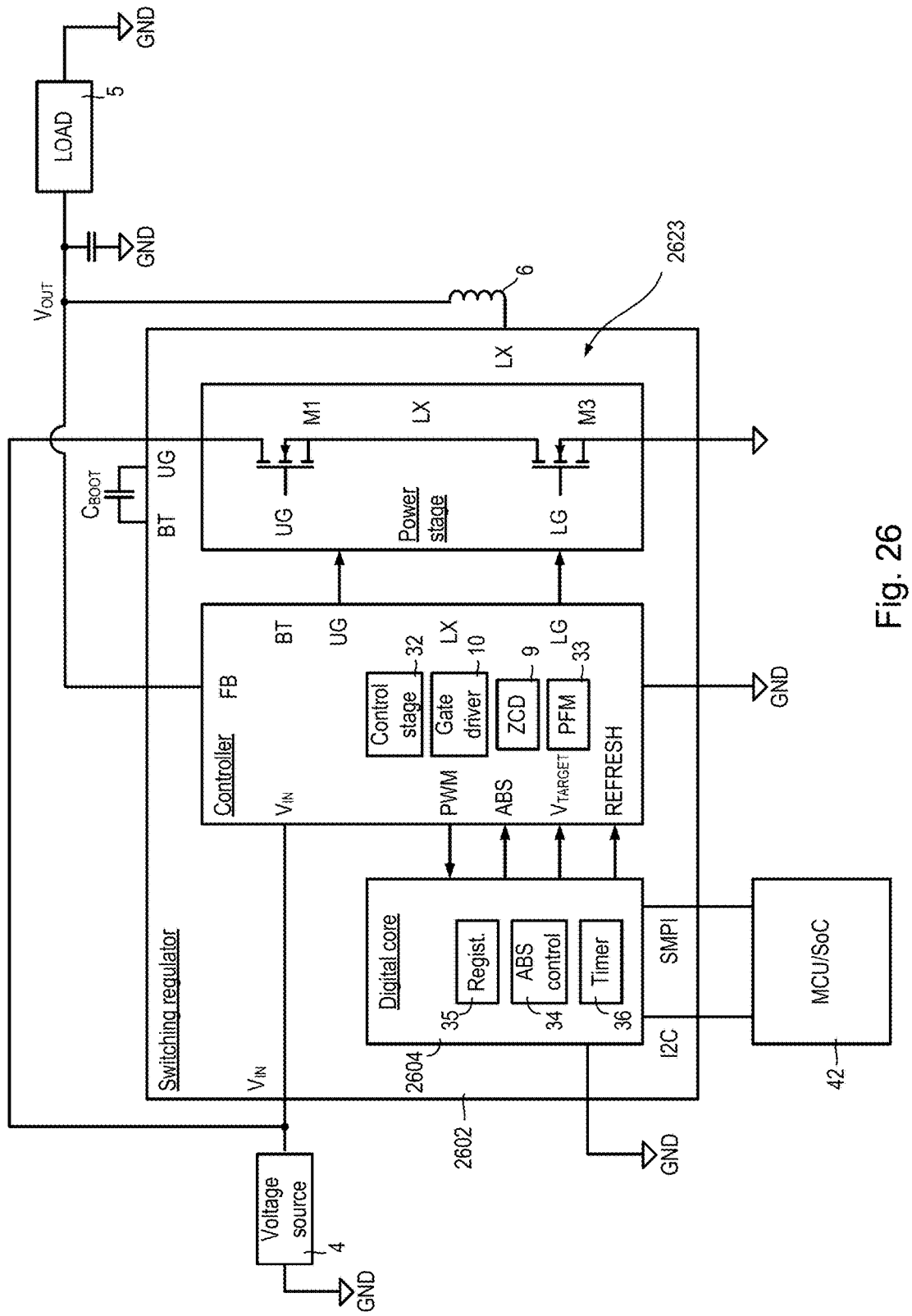
FIG. 26 is a schematic block diagram a buck-boost converter comprising a power converter IC which includes an on-chip power stage and off-chip bootstrap capacitors.

ABS method can also be used in a Buck controller (FIG. 25) and in a Boost controller (FIG. 26).

FIGS. 19A and 19B give more details of the PWM cycle for two-switch buck operation.

FIG. 19A is a state diagram 1900 for the buck controller shown in FIG. 24.

Referring to FIGS. 19A and 24, state transitions for a buck controller will now be described.

Starting from Buck-ON state 1901, when PWM goes low, the FSM transitions to Buck-OFF state 1902. Inductor current ramps down. When PWM goes high, the FSM transitions to Buck-ON state 1901 and inductor current increases.

If the PWM is high and ZCD is high, then the FSM transitions to tristate 1903. The system remains in Tri-state 1903 until either PWM or REFRESH goes high. If the load is moderate, then REFRESH will not go high. This is PFM mode (DCM mode) of operation. In the PFM mode, FSM transitions between Buck-ON 1901, Buck-OFF 1902 and Tri-state 1903. PWM has higher priority over REFRESH.

FIG. 19B is a table which show the gate drive signals UG1, LG1, UG2, LG2 when the buck controller is in each state.

In this case, the Refresh state 1904 can be used only pulling up the internal ramp $V_R$. This can occur for only a short period, namely a few tens of nanoseconds. This can be followed by ABS and during ABS the refresh capacitor is also re-charged.

FIGS. 20A to 20C give more details of the PWM cycle for boost operation.

FIG. 20A is a state diagram 2000 for the buck-boost controller shown in FIG. 16. The state machine 2000 includes Boost-ON, Boost-OFF, Tristate, Refresh & ABS states 2001, 2002, 2003, 2004, 2005.

FIG. 20B is magnified view of FIG. 12C and shows the state of the simulated buck-boost controller. FIG. 20B shows transitioning of the buck-boost controller from ABS state 2005 to Boost-ON state 2001 in response to PWM (not shown) and to Boost-OFF state 2002 in response to nPWM (not shown).

FIG. 20C is a table which show the gate drive signals UG1, LG1, UG2, LG2 when the buck-boost controller is in each state.

FIGS. 21A and 21B give more details of the PWM cycle for two-switch boost operation.

FIG. 21A is a state diagram 2100 for the boost controller shown in FIG. 26.

Referring to FIGS. 21A and 26, state transitions for a boost controller will now be described. Starting from Boost-ON state 2101, when PWM goes low, the FSM transitions to Boost-OFF state 2102. Inductor current ramps down. When PWM goes high, the FSM transitions to Buck-ON state 2101 and inductor current increases. If the PWM is high and ZCD is high, then the FSM transitions to Tri-state 2103. The system remains in Tri-state 2103 until either PWM or REFRESH goes high. If the load is moderate, then REFRESH will not go high. This is PFM mode (DCM mode) of operation. In the PFM mode, FSM transitions between Boost-ON 2101, Boost-OFF 2102 and Tri-state 2103. PWM has higher priority over REFRESH.

FIG. 21B is a table which show the gate drive signals UG1, LG1, UG2, LG2 when the buck controller is in each state. In this case, the Refresh state 2104 can be used only pulling up the internal ramp $V_R$. This can occur for only a short period, namely a few tens of nanoseconds. This can be followed by ABS and during ABS the refresh capacitor is also re-charged.

FIGS. 22A to 22C give more details of the PWM cycle for buck-boost operation.

FIG. 22A is a state diagram 2000 for the buck-boost controller shown in FIG. 16. The state machine 2200 includes Boost-ON, T2 period, Buck-OFF, Tristate, Refresh & ABS states 2201, 2202, 2203, 2204, 2205, 2206.

FIG. 22B is magnified view of FIG. 13C and shows the state of the simulated buck-boost controller.

FIG. 22B shows transitioning of the buck-boost controller from ABS state 2205 to Boost-ON state 2201 in response to PWM (not shown) and to T2 Period 2202 in response to nPWM (not shown) and, once the T2 period has elapsed, transitioning to Buck-OFF state 2203.

FIG. 22C is a table which show the gate drive signals UG1, LG1, UG2, LG2 when the buck-boost controller is in each state.

Figure 23:
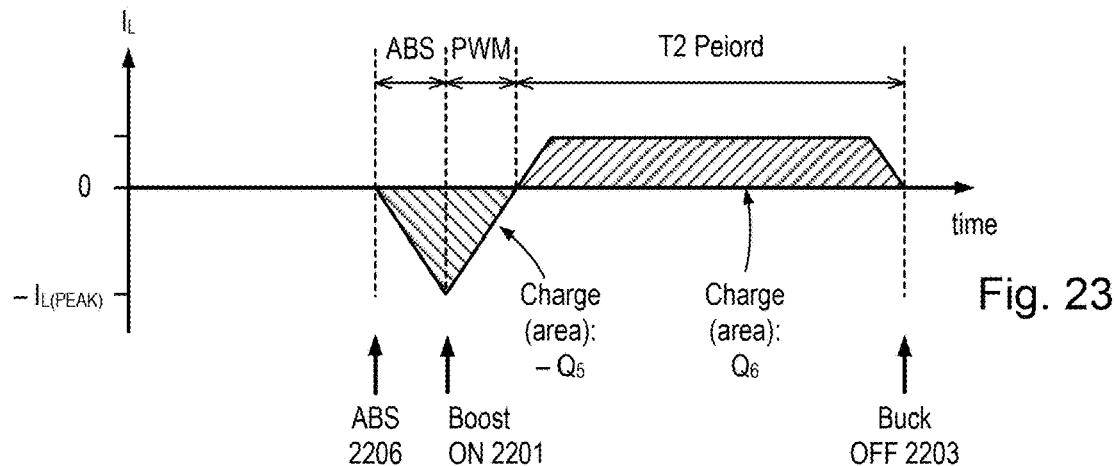
FIG. 23 is a schematic plot of inductor current against time illustrating charge removed from the inductor and charge added to the inductor during an ABS-PWM cycle which can result in an increase in buck-boost output voltage VOUT.

FIG. 23 is a schematic view of the current-time plot shown in FIG. 22B. Referring also to FIG. 23, in the simulation described with reference to FIGS. 22A to 22C, the charge $Q_5$ extracted from the inductor is less than the charge $Q_6$ returned during PWM. Thus, the output voltage $V_{OUT}$ can increase as hereinbefore described.

Figure 24A:
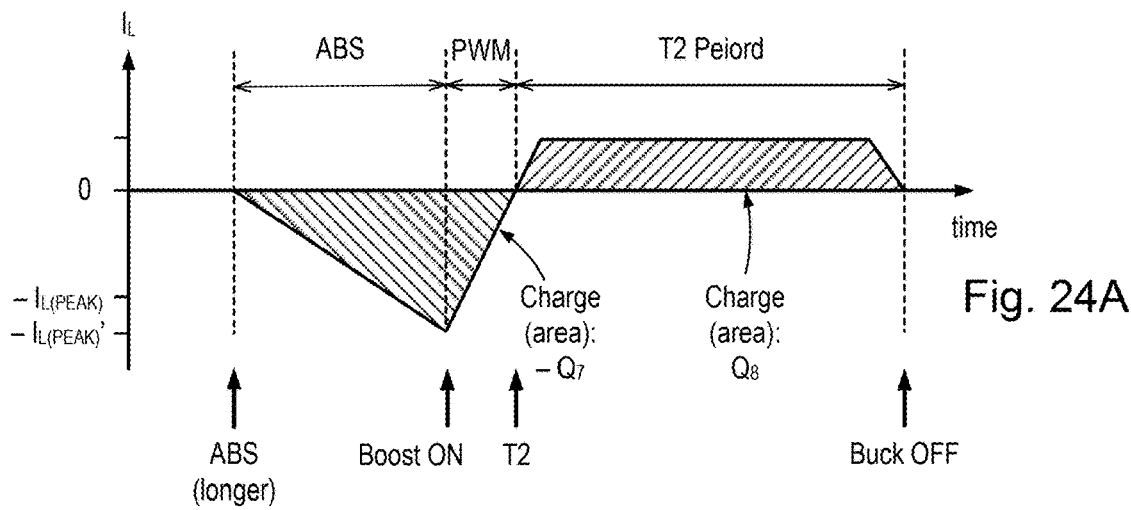
FIG. 24A is a schematic plot of inductor current against time illustrating charge removed from the inductor and charge added to the inductor during a ABS-PWM cycle with an extended ABS duration which can help reduce or even avoid an increase in buck-boost output voltage VOUT
Figure 24B:
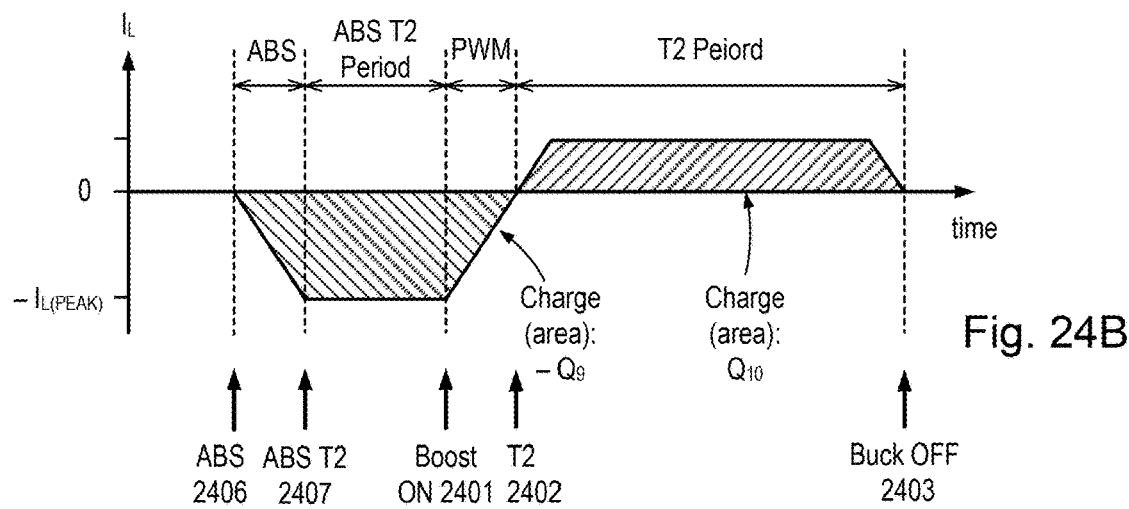
FIG. 24B is a schematic plot of inductor current against time illustrating charge removed from the inductor and charge added to the inductor during an ABS-ABS T2-PWM cycle which can help reduce or even avoid an increase in buck-boost output voltage VOUT.

FIGS. 24A and 24B illustrate two approaches to reducing and even avoiding an increase in output voltage $V_{OUT}$.

FIG. 24A illustrates a modified current-time plot in which a longer ABS period is used. This extends the time during which—and, thus, increase the amount of—charge $Q_7$ extracted from the inductor so as to satisfy the requirement that the amount of charge $Q_7$ extracted from the inductor is less than the charge $Q_8$ returned during PWM.

FIG. 24B illustrates a modified current-time plot in which an additional T2 Period state (herein referred to as "ABS T2 Period") can be used to extend the time during which—and, thus, increase the amount of—charge $Q_9$ extracted from the inductor so as to satisfy the requirement that the amount of charge $Q_{10}$ extracted from the inductor is less than the charge $Q_{10}$ returned during PWM.

Referring to FIGS. 24B, 24C and 24D, in addition to Boost-ON, T2 period, Buck-OFF, Tristate, Refresh & ABS states 2401, 2402, 2403, 2404, 2405, 2406, an additional ABS T2 Period state 2407 is provided after the ABS state 2406 and Boost-ON state 2401. Buck-boost converter with on-chip power transistors and off-chip bootstrap capacitors Referring to FIG. 25, a fourth power management system 2301 is shown. The power management system 2501 includes a switching regulator 2502 in the form of a buck-boost converter 2502 having an off-chip inductor 6. The switching regulator 2502 includes a controller 2503 and a digital core 2504. The controller 2503 includes a zero-crossing detector 9, a gate driver 10 and a control stage 32 and PFM control logic 33 as hereinbefore described. The digital core 1404 includes the ABS control 34, registers 35 and timers 36. The power stage 2523 includes first and second high-side NMOS switches M1, M2 and third and fourth low-side NMOS switches M3, M4 which are on-chip. The power stages 2523 include bootstrap capacitors $C_{BOOT1}$, $C_{BOOT2}$ which are off-chip. The digital core 2504 can be controlled via I2C and SMPI bus interfaces by a host 44 for example in the form of microcontroller or SoC.

The controller 2503 generates the ramp $V_R$, the window voltages, $V_{W+}$, $V_{W-}$ and controls transition between PWM and PFM modes. The digital core 2504, generates ABS and REFRESH signals. The digital core 2504 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration $\Delta T$, starting REFRESH→ABS→PWM state transitions. If audio band suppression mode is switched off, then the refresh time $T_{REFRESH}$ is set to the maximum time that a bootstrap can hold charge, typically about 500 µs. If audio band suppression is switched on, then a shorter refresh time $T_{REFRESH}$ is used, in particular to being less than or equal to 50 µs. Buck converter with on-chip power transistors and off-chip bootstrap capacitor Referring to FIG. 26, a fifth power management system 2601 is shown. The power management system 2601 includes a switching regulator 2602 in the form of a buck converter 2602 having an off-chip inductor 6. The switching regulator 2602 includes a controller 2203 and a digital core 2604. The controller 2603 includes a zero-crossing detector 9, a gate driver 10 and a control stage 32 and PFM control logic 33 as hereinbefore described. The digital core 2604 includes the ABS control 34, registers 35 and timers 36. The power stage 2623 includes a first high-side NMOS switch M1 and a third low-side NMOS switches M3 which are on-chip. The power stages 2623 include a bootstrap capacitor $C_{BOOT}$ which is off-chip. The digital core 2604 can be controlled via I2C and SMPI bus interfaces by a host 44 for example in the form of microcontroller or SoC.

The controller 2603 generates the ramp $V_R$, the window voltages, $V_{W+}$, $V_{W-}$ and controls transition between PWM and PFM modes. The digital core 2604, generates ABS and REFRESH signals. The digital core 2604 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration $\Delta T$, starting REFRESH→ABS→PWM state transitions. If audio band suppression mode is switched off, then the refresh time $T_{REFRESH}$ is set to the maximum time that a bootstrap can hold charge, typically about 500 µs. If audio band suppression is switched on, then a shorter refresh time $T_{REFRESH}$ is used, in particular to being less than or equal to 50 µs.

Figure 27:
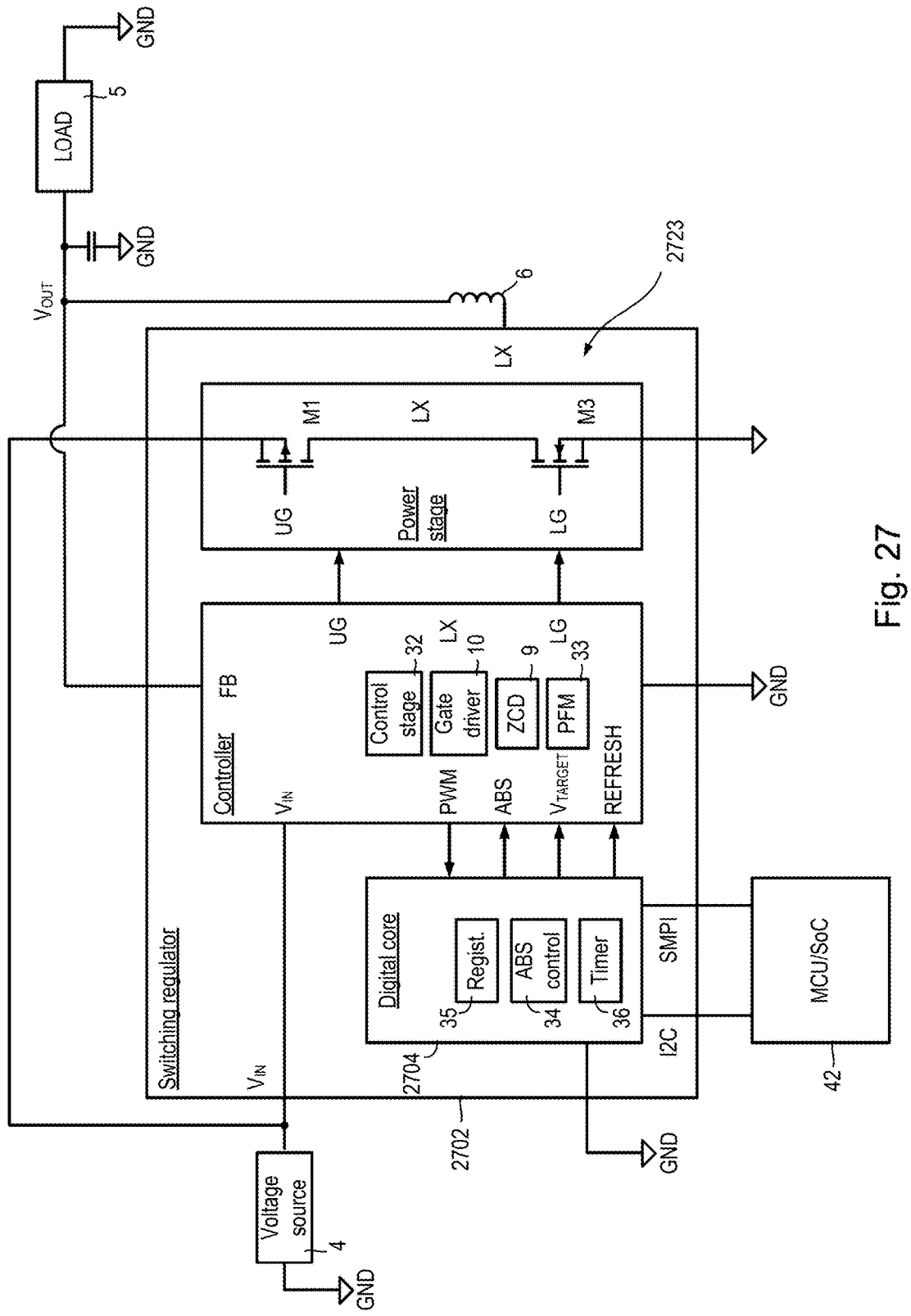
FIG. 27 is a schematic block diagram of a buck converter comprising a power converter IC which includes an on-chip power stage and an off-chip bootstrap capacitor.

Buck converter with on-chip power transistors and no bootstrap capacitor. Referring to FIG. 27, a sixth power management system 2701 is shown. The power management system 2301 includes a switching regulator 2702 in the form of a buck converter 2702 having an off-chip inductor 6. The switching regulator 2702 includes a controller 2703 and a digital core 2704. The controller 2703 includes a zero-crossing detector 9, a gate driver 10 and a control stage 32 and PFM control logic 33 as hereinbefore described. The digital core 2704 includes the ABS control 34, registers 35 and timers 36. The power stage 2723 includes a first high-side NMOS switch M1 and a third low-side NMOS switches M3 which are on-chip. The digital core 2704 can be controlled via I2C and SMPI bus interfaces by a host 44 for example in the form of microcontroller or SoC.

Figure 28:
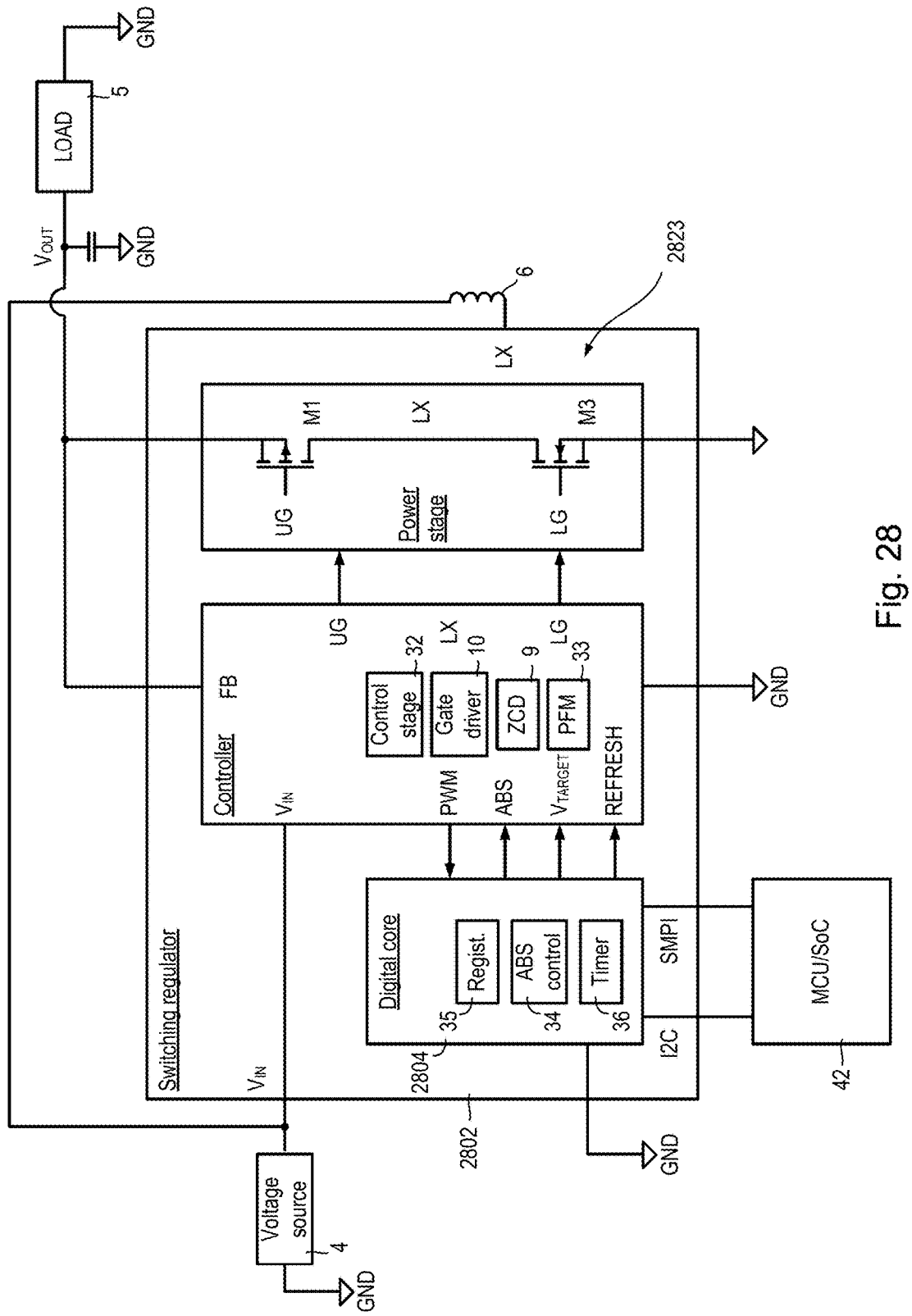
FIG. 28 is a schematic block diagram of a buck converter comprising a power converter IC which includes an on-chip power stage and an off-chip bootstrap capacitor.

The controller 2703 generates the ramp $V_R$, the window voltages, $V_{W+}$, $V_{W-}$ and controls transition between PWM and PFM modes. The digital core 2704, generates ABS and REFRESH signals. The digital core 2704 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration ΔT, starting REFRESH→ABS→PWM state transitions. If audio band suppression mode is switched off, then the refresh time $T_{REFRESH}$ is set to the maximum time that a bootstrap can hold charge, typically about 500 µs. If audio band suppression is switched on, then a shorter refresh time $T_{REFRESH}$ is used, in particular to being less than or equal to 50 µs Boost converter with on-chip power transistors and no bootstrap capacitor. Referring to FIG. 28, a sixth power management system 2801 is shown. The power management system 2801 includes a switching regulator 2802 in the form of a boost converter 2802 having an off-chip inductor 6. The switching regulator 2802 includes a controller 2803 and a digital core 2804. The controller 2803 includes a zero-crossing detector 9, a gate driver 10 and a control stage 32 and PFM control logic 33 as hereinbefore described. The digital core 2804 includes the ABS control 34, registers 35 and timers 36. The power stage 2823 includes a first high-side NMOS switch M1 and a third low-side NMOS switches M3 which are on-chip. The digital core 2804 can be controlled via I2C and SMPI bus interfaces by a host 44 for example in the form of microcontroller or SoC.

The controller 2803 generates the ramp $V_R$, the window voltages, $V_{W+}$, $V_{W-}$ and controls transition between PWM and PFM modes. The digital core 2804, generates ABS and REFRESH signals. The digital core 2804 is able to communicate with a host 42 through SPMI and I2C ports. Audio band suppression can be turned on and off (i.e., switched been first and second modes) by suitable instructions through these communication channels. If a PWM pulse has not occurred for a time T greater than or equal to $T_{REFRESH}$, then REFRESH signal goes high for a duration ΔT, starting REFRESH→ABS→PWM state transitions. If audio band suppression mode is switched off, then the refresh time $T_{REFRESH}$ is set to the maximum time that a bootstrap can hold charge, typically about 500 µs. If audio band suppression is switched on, then a shorter refresh time $T_{REFRESH}$ is used, in particular to being less than or equal to 50 µs.

Modifications. It will be appreciated that various modifications may be made to the embodiments hereinbefore described. Such modifications may involve equivalent and other features which are already known in the design, manufacture and use of power management and component parts thereof and which may be used instead of or in addition to features already described herein. Features of one embodiment may be replaced or supplemented by features of another embodiment. A simpler ramp generator circuit may be used employing a resistor in series with a capacitance across the inductor. The voltage across the capacitance can be used as a ramp. However, in this approach, noise in the switching node (LX) may affect the ramp voltage. PFM operation can be omitted and so the power management system can operate only in continuous conduction mode (CCM).

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of operating a hysteretic synthetic current-mode switching, wherein pulse-width modulation (PWM) pulses are generated by a PWM generator in dependence upon a ramp voltage which oscillates between upper and lower window voltages and which depends on a control voltage which depends on a current through an inductor, the method comprising:
    determining whether a time period equal to or greater than a given time period has elapsed without a PWM pulse being generated;
    upon a positive determination, causing the ramp voltage to be pulled up to or above the upper window voltage for a given time duration; and
    when said given time duration has elapsed, causing the ramp voltage to decrease until a rising edge of the PWM pulse is generated.

2. The method of claim 1, wherein the given time period is between 400 and 600 microseconds or between 5 and 50 microseconds.

3. The method of claim 1, wherein decreasing the ramp voltage comprises:
    decreasing the ramp voltage at a rate such that energy stored in the inductor is the same as or greater than the energy output by the inductor during the PWM pulse.

4. The method of claim 3, wherein decreasing the ramp voltage comprises:
    adjusting a gain of a transconductance amplifier which generates the ramp voltage independence upon an output voltage.

5. The method of claim 1, wherein a first amount of energy is extracted from the inductor in response to decreasing the ramp voltage which is greater than or equal to a second amount of energy supplied to the inductor from in a period starting with the rising edge of the PWM pulse.

6. A device configured to perform the method of claim 1.

7. A control circuit for controlling a hysteretic synthetic current-mode switching regulator wherein pulse-width modulation (PWM) pulses are generated by a PWM generator in dependence upon a ramp voltage which oscillates between upper and lower window voltages and which depends on a control voltage which depends on a current through an inductor, the device configured to:
    determine whether a time period equal to or greater than a given time period has elapsed without a PWM pulse being generated;
    upon a positive determination, cause the ramp voltage to be pulled up to or above the upper window voltage for a given time duration; and
    when said given time duration has elapsed, cause the ramp voltage to decrease until a rising edge of the PWM pulse is generated.

8. The control circuit of claim 7, further configured to:
set a first control signal provided to a control stage of the switching regulator so as to cause the ramp voltage to be pulled up to or above the upper window voltage.

9. The control circuit of claim 7, further configured to:
set a second control signal provided to a pulse-frequency modulation control circuit and to the control stage of the switching regulator so as to cause the ramp voltage to be pulled up to or above the upper window voltage.

10. A switching regulator comprising:
a control stage comprising:
    a synthetic ramp generator circuit for generating a ramp voltage, the synthetic ramp generator circuit including:
    a transconductance amplifier;
    a voltage ramp node;
    a modulator capacitor connected between the voltage ramp node and a reference level node;
    a first switch interposed between the output of the transconductance amplifier and the voltage ramp node; and
    a second switch interposed between a voltage reference level and the voltage ramp node;
    a hysteretic control section circuit for controlling oscillation of the ramp voltage between upper and lower window voltages and generating first and second signals for setting and re-setting the PWM signal respectively; and a latch for generating the PWM pulses using the first and second signals; and the control circuit of claim 7 configured to receive the PWM pulse from the control stage and provide control signals to the control stage for controlling gain of the transconductance amplifier and the first and second switches.

11. The switching regulator according to claim 10, further comprising:

a power stage for at least one of stepping up and stepping down an input voltage to provide an output voltage.

12. The switching regulator according to claim 10, which is a buck controller, a boost controller or a buck-boost controller.

13. The switching regulator of claim 10, further comprising:

at least one bootstrap capacitor.

14. A monolithic integrated circuit comprising the switching regulator of claim 10.

\* \* \* \* \*